(12) United States Patent
Kuroda et al.

(10) Patent No.: US 8,395,338 B2
(45) Date of Patent: Mar. 12, 2013

(54) CONTROL SYSTEM FOR MULTIPHASE ELECTRIC ROTATING MACHINE

(75) Inventors: Masahiro Kuroda, Yokkaichi (JP); Hiroshi Taki, Okazaki (JP); Nobumasa Ueda, Nagoya (JP)

(73) Assignee: DENSO CORPORATION, Kariya (JP)

( * ) Notice: Subject to any disclaimer, the term of this patent is extended or adjusted under 35 U.S.C. 154(b) by 863 days.

(21) Appl. No.: 12/314,716

(22) Filed: Dec. 16, 2008

(65) Prior Publication Data

US 2009/0174350 A1 Jul. 9, 2009

(30) Foreign Application Priority Data

| Jan. 9, 2008 | (JP) | 2008-1952 |
| Jan. 9, 2008 | (JP) | 2008-1953 |
| Apr. 4, 2008 | (JP) | 2008-98239 |

(51) Int. Cl.
*H02P 6/04* (2006.01)

(52) U.S. Cl. .......... 318/400.11; 363/109; 363/98; 318/400.32; 318/400.34; 318/459; 318/599; 318/811

(58) Field of Classification Search .......... 318/400.11, 318/400.32, 400.34, 459, 599, 811; 363/109, 363/98
See application file for complete search history.

(56) References Cited

U.S. PATENT DOCUMENTS

| 5,079,494 A * | 1/1992 | Reichard ............... 318/811 |
| 5,206,567 A * | 4/1993 | Sakurai et al. ........ 318/400.34 |
| 5,256,949 A * | 10/1993 | Reichard et al. ...... 318/400.01 |
| 5,396,159 A | 3/1995 | Kaneda |
| 6,104,152 A * | 8/2000 | Coles et al. ........... 318/400.04 |
| 6,124,688 A * | 9/2000 | Coles et al. ........... 318/400.09 |
| 6,661,192 B2 * | 12/2003 | Copeland ............... 318/400.35 |
| 6,949,900 B1 * | 9/2005 | Berringer .............. 318/400.03 |
| 7,053,587 B2 * | 5/2006 | Ito et al. ................. 318/801 |
| 7,294,982 B2 * | 11/2007 | Kurosawa et al. ...... 318/400.2 |

FOREIGN PATENT DOCUMENTS

| JP | A-H5-030759 | 2/1993 |
| JP | A-05-91790 | 4/1993 |
| JP | A-07-147793 | 6/1995 |
| JP | A-8-151748 | 6/1996 |
| JP | A-09-312993 | 12/1997 |
| JP | A-10-234198 | 2/1998 |
| JP | A-11-18478 | 1/1999 |
| JP | A-2000-156994 | 6/2000 |
| JP | A-2004-104997 | 4/2004 |

OTHER PUBLICATIONS

Office Action mailed Feb. 21, 2011 from the China Patent Office in corresponding Chinese Patent Application No. 200910002604.9 (and English Translation).

(Continued)

*Primary Examiner* — Walter Benson
*Assistant Examiner* — Erick Glass
(74) *Attorney, Agent, or Firm* — Posz Law Group, PLC

(57) ABSTRACT

A control system controls a multiphase rotating machine by a 120° energization process and a PWM process. In the 120° energization process, respective ones of switching elements of a high side arm and switching elements of a low side arm of a power conversion circuit are turned on. In the PWM process, the switching elements of the power conversion circuit turn on/off so that two phases that are connected to the switching elements that are in the on-state are alternately rendered conductive to the high potential side input terminal and the low potential side input terminal of the power conversion circuit.

9 Claims, 26 Drawing Sheets

OTHER PUBLICATIONS

Office Action mailed Oct. 20, 2009 from the Japan Patent Office in the corresponding Japanese Patent Application No. 2008-001952 (and English Translation).

Office Action mailed Oct. 20, 2009 from the Japan Patent Office in the corresponding Japanese Patent Application No. 2008-001953 (and English Translation).

* cited by examiner

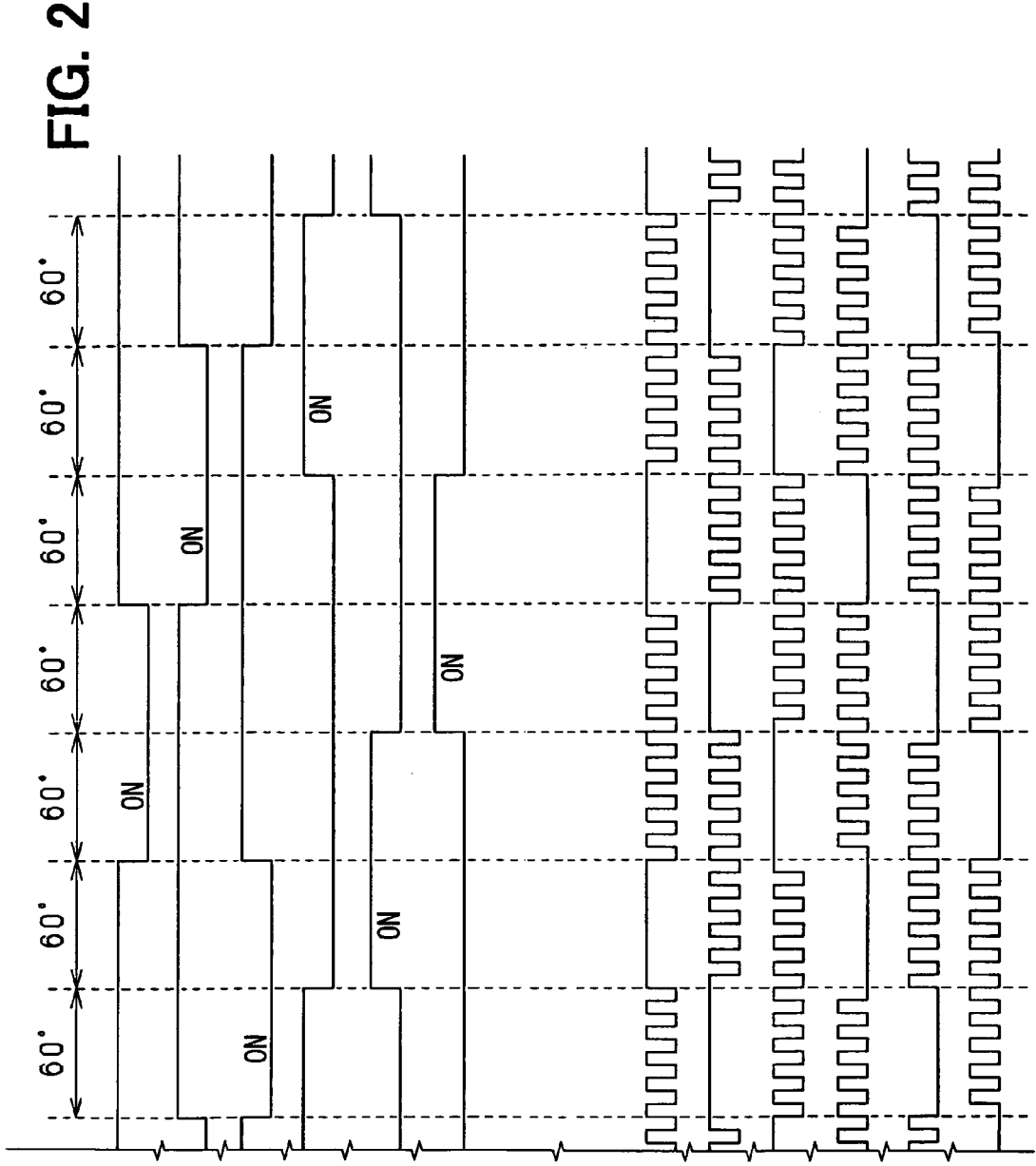

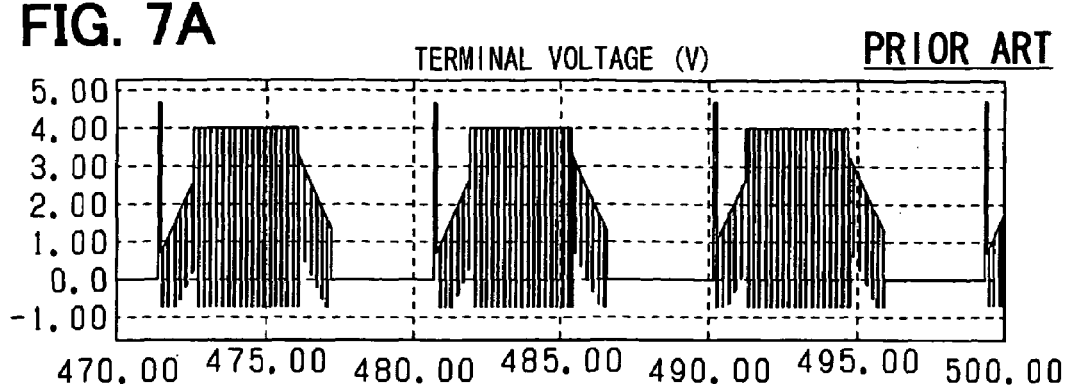
FIG. 7A  TERMINAL VOLTAGE (V)  PRIOR ART
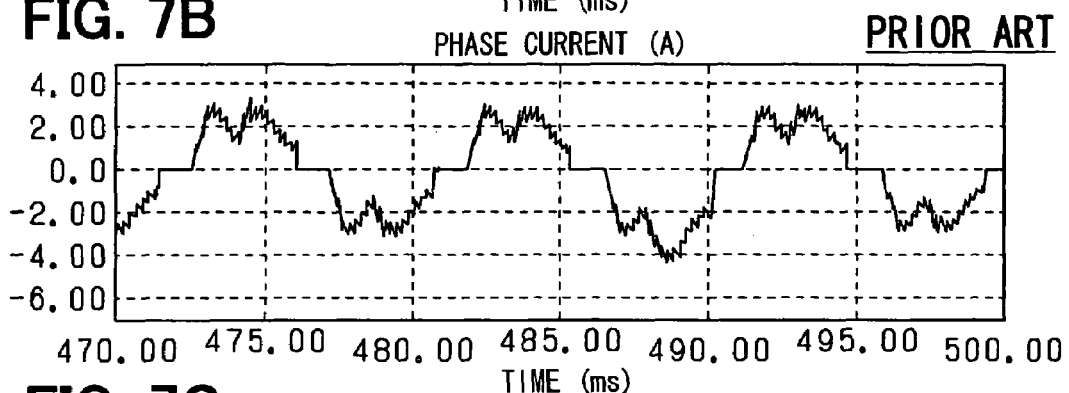
FIG. 7B  PHASE CURRENT (A)  PRIOR ART
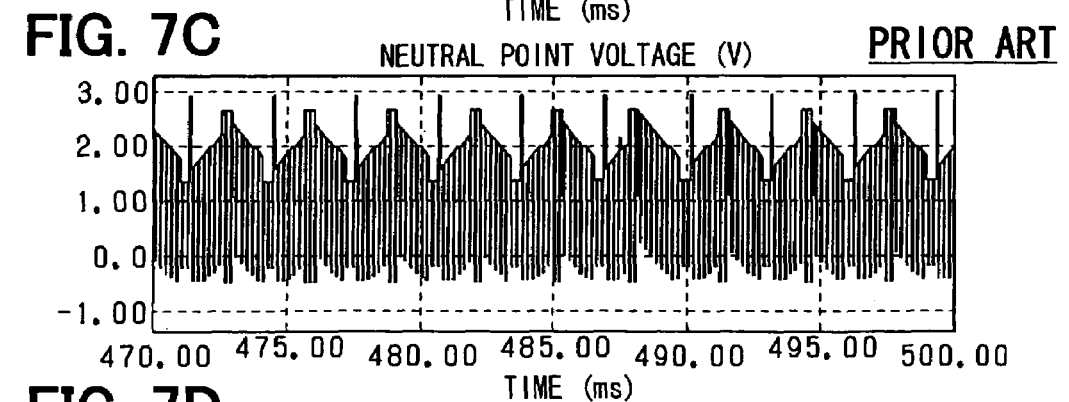
FIG. 7C  NEUTRAL POINT VOLTAGE (V)  PRIOR ART
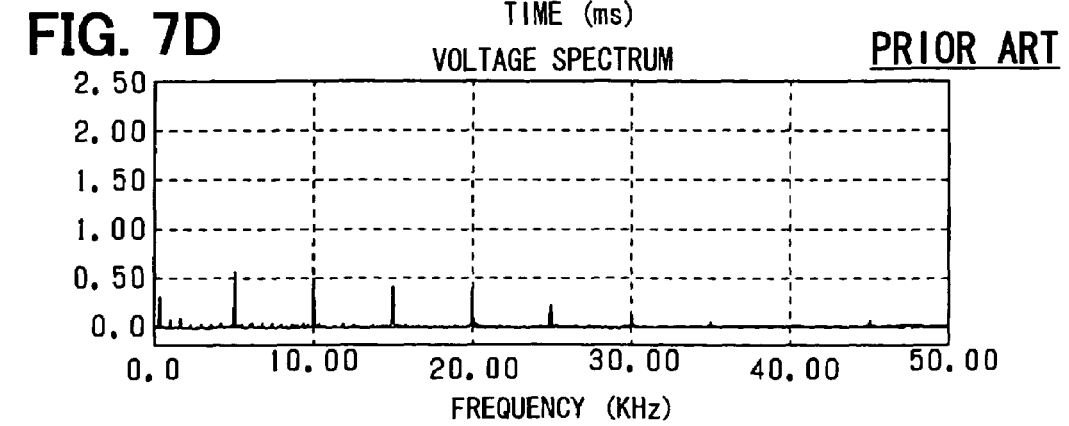
FIG. 7D  VOLTAGE SPECTRUM  PRIOR ART

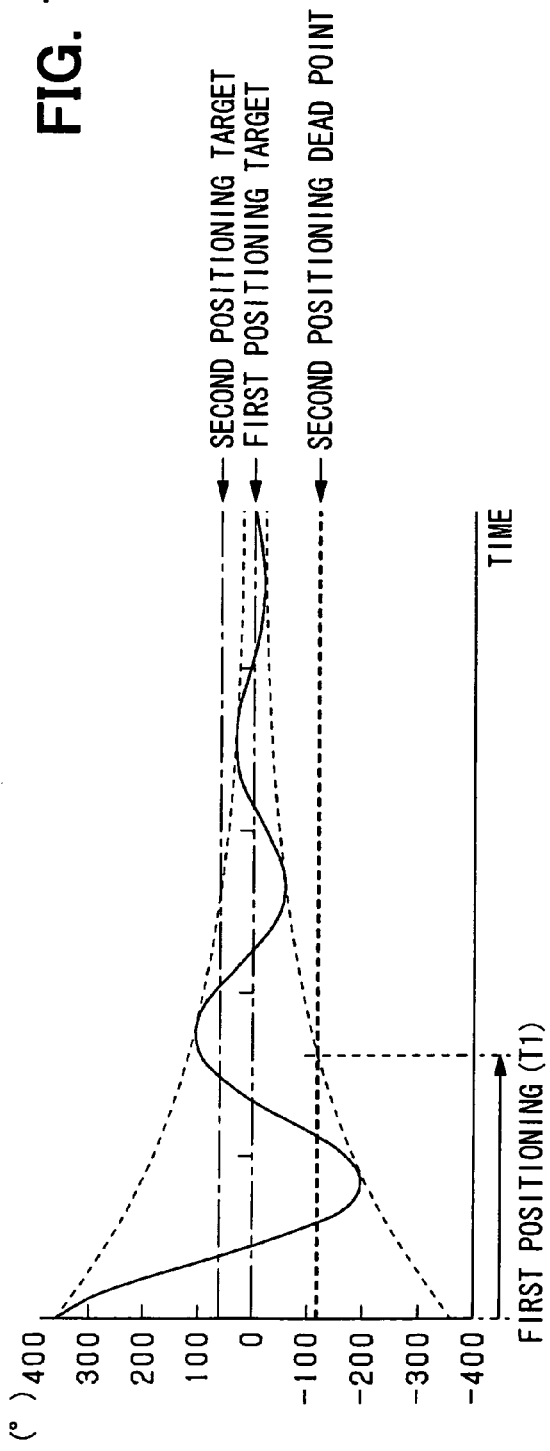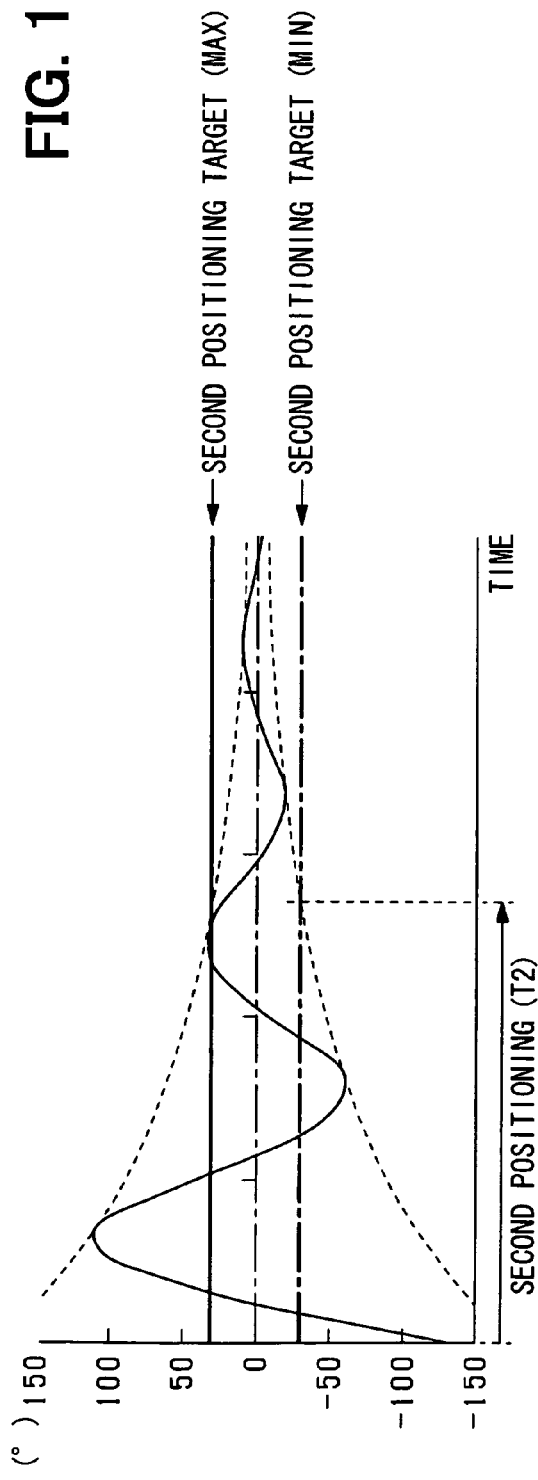

| ORDER | Cu | Cv | Cw |
|---|---|---|---|
| 1 | L | L | H |
| 2 | H | L | H |
| 3 | H | L | L |
| 4 | H | H | L |
| 5 | L | H | L |
| 6 | L | H | H |

CONTROL SYSTEM FOR MULTIPHASE ELECTRIC ROTATING MACHINE

CROSS REFERENCE TO RELATED APPLICATIONS

This application is based on and incorporates herein by reference Japanese Patent Applications No. 2008-1952 filed on Jan. 9, 2008, No. 2008-1953 filed on Jan. 9, 2008 and No. 2008-98239 filed on Apr. 4, 2008.

FIELD OF THE INVENTION

The present invention relates to a control system for a multiphase electric rotating machine that applies a voltage to the multiphase rotating machine by operating switching elements of a power conversion circuit.

BACKGROUND OF THE INVENTION

In one conventional control system for a multiphase electric motor, for example, JP-9-312993A, a voltage of a rectangular waveform is modulated in pulse width when the voltage of the rectangular waveform is applied to a three-phase electric motor through 120° energization method (system). In this system, the pulse width modulation (PWM) is conducted in synchronism with the changeover timing of switching for applying the voltage of the rectangular waveform. This suppresses noises when changing over a switching element which conducts the pulse width modulation.

When the PWM processing is conducted in the above manner, the neutral point potential of a brushless motor changes in synchronism with the pulse width modulation. On the other hand, because the neutral point of the electric motor is generally disposed adjacent to a conductor through an insulator, the neutral point potential is equivalently grounded through a capacitor. In this case, when the neutral point potential changes in synchronism with the pulse width modulation, a current flows in the conductor side through the insulator from the neutral point, and the current may become a noise.

In another conventional control system for a multiphase electric rotating machine, when a three-phase electric motor is driven in a sensorless manner, an energization process from one specific phase to another phase is conducted twice while changing the phase so as to acquire an initial value of the rotation angle, to thereby fix the rotation angle. Even if the rotation angle of a rotor before the energization process starts is set to an uncontrollable angle which is close to an electric angle 180° (dead point) with respect to the final rotation angle because the rotation angle is thus controlled to the final rotation angle through two energization processes, the rotation angle of the electric motor can be controlled to the final rotation angle. That is, when the rotation angle of the rotor before the energization process starts is close to the dead point, the rotor cannot be changed by the energization process for controlling the rotation angle to the final rotation angle. However, the energization process is conducted twice, thereby making it possible to control the rotation angle of the electric motor to the final rotation angle.

In the energization processes of two times, for example, JP 3244800 (U.S. Pat. No. 5,396,159) proposes a technique in which the respective energization process times are set so that a frequency f1 (½×(processing time)) of the first processing, a frequency f2 (½ (processing time)) of the second processing, and a natural frequency of the electric motor satisfy a relationship of f1>F0>f2. As a result, the electric motor can be surely rotated forwardly when the electric motor starts.

A convergence time required when the electric motor is energized to converge the rotation angle to a given angle depends on inertia of the electric motor and a friction between the rotor and a bearing. That is, the convergence time is longer as the inertia is larger or the friction is smaller. For this reason, when the first energization process time is set based on a natural frequency in the above example, it is likely that the rotation angle of the start time point of the second energization process becomes an uncontrollable angle which is close to the dead point depending on the electric motor. In this case, the electric motor cannot appropriately start.

In a further conventional control system for a multiphase electric rotation machine, a rotor position is detected by detecting an induced voltage which appears in the terminal voltage of the stator windings without any rotor position detector, for example, a Hall element. For example, when a three-phase brushless DC motor is driven through a 120° energization method, a position signal is detected based on a comparison of the terminal voltage of the open phase with a reference voltage. In this case, in order to control the voltage applied to the motor and a current that flows in the motor, pulse width modulation control or current limit control is conducted.

Ringing (cyclic fluctuation) occurs in the terminal voltage when the energization to the stator windings changes from off-state to on-state under the PWM control or the current limit control. When the ringing occurs in the terminal voltage, a phase displacement (variation in time) occurs in the position signal that is provided by comparison of the terminal voltage with the reference voltage, resulting in rotation irregularity, noises, or step-out of phase.

JP 3,308,680 therefore proposes to latch a comparison result signal of the terminal voltage and the reference voltage at a down timing from the on-state to the off-state of the PWM signal. Therefore, the position signal can be provided without being affected by ringing which occurs in the terminal voltage. However, it is necessary to add a latch circuit to a microcomputer or a logic circuit which has been applied up to now as a new function circuit, or to accommodate with a latch circuit that is one of resources which are equipped in a microcomputer from another intended purpose. As a result, the circuit is complicated.

SUMMARY OF THE INVENTION

It is therefore a first object of the present invention to provide a control system for a multiphase electric rotating machine, which is capable of suitably suppressing occurrence of noises by operating switching elements of a power converter circuit when a voltage is applied to the multiphase rotating machine.

It is a second object of the present invention to provide a control system for an electric rotating machine, which position-controls a rotation angle of an electric rotating machine to a final angle through an intermediate angle thereby to appropriately start the rotating machine.

It is a third object of the present invention to provide a control system for a multiphase electric rotating machine, which is capable of accurately detecting a position signal without complicating system configuration.

According to a first aspect for attaining the first object, a control unit is provided for a multiphase rotating machine, which is controlled by a power conversion circuit having a plurality of switching elements. The control unit operates the switching elements so as to alternately change over a state in which a first phase is rendered conductive to a high potential side input terminal and a second phase is rendered conductive to a low potential side input terminal, respectively, and a state in which the first phase is rendered conductive to the low potential side input terminal and the second phase is rendered conductive to the high potential side input terminal, respectively. The control unit thus modulates a voltage of a rectangular waveform applied to the rotating machine in pulse width.

Alternatively, the control unit operates the power conversion circuit so as to divide remaining phases into a first phase and a second phase, and alternately renders the first phase and the second phase conductive to the high potential side input terminal and the low potential side input terminal.

According to a second aspect for attaining the second object, a control unit conducts a process for allowing a current to flow from one phase into another phase of a rotating machine by plural times while changing at least one of the one phase and the another phase to control a rotation angle of the rotating machine to a final angle through an intermediate angle. The control unit thereby determines an initial value of a rotating angle when starting the rotating machine according to the final angle. A required time after a process immediately before a final process among the plurality of processes starts until the final process starts is set to be longer than a first time during which an angle interval between a target value of the rotation angle due to the process immediately before the final process and an uncontrollable angle relative to the final angle by the final process is assumed to coincide with an amplitude of variation of the rotation angle of the rotating machine.

Alternatively, the process is shifted to the final process under a convergence condition that an actual rotation angle is converged to a target value of the rotation angle by the process immediately before the final process among the plurality of processes. The convergence condition is satisfied when the variation of the rotation angle by the process immediately before the final process is damped until the variation of the rotation angle falls within a region which is centered on the target value of the rotation angle by the process immediately before the final process and closer than the uncontrollable angle of the final process.

According to a third aspect for attaining the third object, a control unit generates a mask signal, which is validated simultaneously when or before a PWM signal for switching elements of a power converter circuit changes from an on-state to an off-state, and invalidated after a given delay time is elapsed after the PWM signal changes from the off-state to the on-state. The control unit produces a commutation signal of a logic under the condition where a logic of comparison signals of the respective phases, which are output as a result of comparison of terminal voltages of the rotating machine with a reference voltage, coincide with a regular logic that is subsequently scheduled with rotation of the rotating machine. The power conversion circuit energizes the stator winding based on the PWM signal and the commutation signal.

Alternatively, the power converter controls the energization of the rotating machine by a current control signal in place of the PWM signal. The mask signal is used to mask the result of comparison.

BRIEF DESCRIPTION OF THE DRAWINGS

The above and other objects, features and advantages of the present invention will become more apparent from the following detailed description made with reference to the accompanying drawings. In the drawings:

FIG. 2 is a timing chart showing the switching control operations according to the first embodiment;

FIGS. 7A to 7D are timing charts showing the simulation results of a conventional PWM processing on the example of a 130° energization process;

FIGS. 10A and 10B are timing charts showing a positioning mode according to the second embodiment;

DETAILED DESCRIPTION OF THE PREFERRED EMBODIMENTS

The present invention will be described in detail with reference to various embodiments, in which a control system for an electric rotating machine is applied as a control system for an in-vehicle electric brushless motor.

(First Embodiment)

Figure 1:
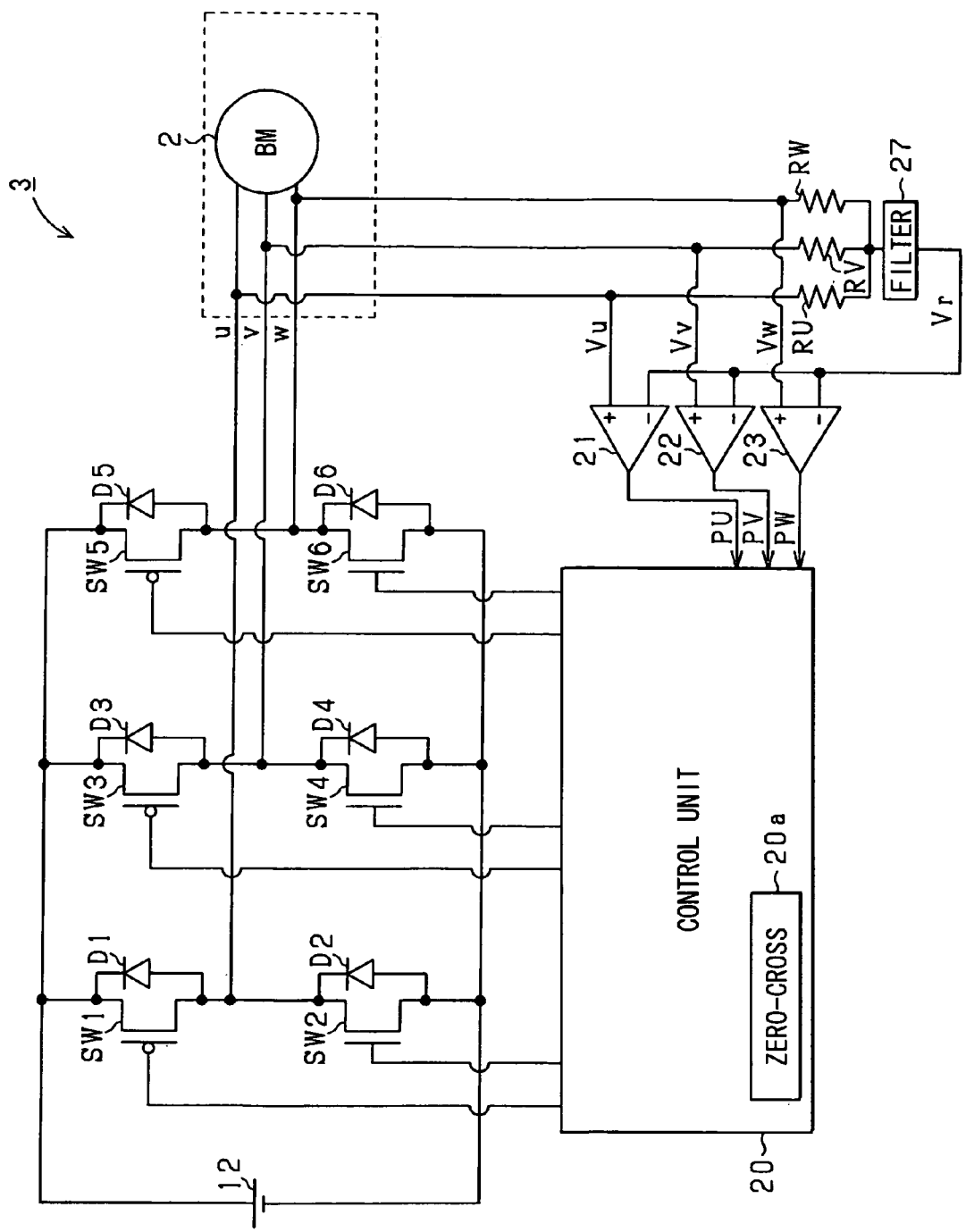
FIG. 1 is a system circuit diagram of a first embodiment of the present invention.

Referring first to FIG. 1, an electric brushless motor 2 is a three-phase electric motor with a permanent magnet as a rotor, and is provided as an actuator of a fuel pump for an internal combustion engine which is mounted in a vehicle. Three phases (U-phase, V-phase, W-phase) of the brushless motor 2 are connected with a power conversion circuit 3 such as an inverter, which is a power converter from the DC power to the AC power. The power conversion circuit 3 is a three-phase power conversion circuit, and a voltage at a battery 12 side is appropriately applied to three phases of the brushless motor 2. Specifically, the power conversion circuit 3 has a parallel connected circuit including switching elements SW1, SW2, switching element SW3, SW4, and switching elements SW5, SW6 so as to render each of those three phases conductive to the positive electrode side or the negative electrode side of the battery 12. A connection point at which the switching element SW1 and the switching element SW2 are connected in series is connected to the U-phase of the brushless motor 2. A connection point at which the switching element SW3 and the switching element SW4 are connected in series is connected to the V-phase of the brushless motor 2. Further, a connection point at which the switching element SW5 and the switching element SW6 are connected in series is connected to the W-phase of the brushless motor 2. The switching elements SW1 to SW6 are connected in parallel to flywheel diodes D1 to D6, respectively.

Each of the switching elements SW1, SW3, and SW5 of high potential-side (high side) arms of the series circuits is formed of a p-channel MOSFET. Each of the switching elements SW2, SW4, and SW6 of low potential-side (low side) arms is formed of an n-channel MOSFET. The flywheel diodes D1 to D6 are parasitic diodes of the MOS field effect transistors.

An electronic control unit 20 is provided to control the brushless motor 2, and operates the power conversion circuit 3. In this example, switching control is basically conducted through 120° energization method or process. This processing is conducted on the basis that a timing (zero-cross timing) at which an induced voltage reaches the neutral point voltage (reference voltage Vr) of the brushless motor 2 is detected by using a timing at which the induced voltage is developed in the terminal voltages Vu, Vv, and Vw of the respective phases of the brushless motor 2. The reference voltage Vr is provided by dividing the terminal voltages Vu, Vv, and Vw of the respective phases of the brushless motor 2 by resistive elements RU, RV and RW. Specifically, the divided voltage is filtered by a filter 27. The zero-cross timing is directed to an inversion timing of the output of comparators 21, 22, and 23 that compare the terminal voltages Vu, Vv, and Vw of the respective phases with the reference voltage Vr. At a timing (regulation timing) that is delayed by a given electric angle (for example, 30°) from the zero-cross timing, the operation of the switching elements SW1 to SW6 are changed over. The control unit 20 includes a zero-cross detection circuit 20a, and may be configured as a logic circuit, or may be configured as a programmed computer, which includes a central processing unit and a memory that stores a control program, etc.

In FIG. 2, (a1) to (f1) show the transition of a switching operation mode of the switching elements SW1 to SW6 in the 120° energization process. Specifically, (a1) shows the transition of an operation signal of the switching element SW1, and (b1) shows the transition of an operation signal of the switching element SW3, (c1) shows the transition of an operation signal of the switching element SW5, and (d1) shows the transition of an operation signal of the switching element SW2, (e1) shows the transition of an operation signal of the switching element SW4, and (f1) shows the transition of an operation signal of the switching element SW6.

As shown in the figure, the respective switching elements SW1 to SW6 turn on for a period equal to each other once in one revolution (360°) of the brushless motor 2. Specifically, because the switching elements SW1, SW3, and SW5 of the high side arm are sequentially turned on by 120°, respectively, the respective on-periods of those switching elements SW1, SW3, and SW5 do not overlap with each other. Similarly, because the switching elements SW2, SW4, and SW6 of the low side arm are sequentially turned on by 120°, respectively, the respective on-periods of those switching elements SW2, SW4, and SW6 do not overlap with each other either.

In the above control unit 20, when a current that flows in the brushless motor 2 exceeds a current limit value, PWM control is so conducted by repeating alternate turning on and off of the switching element to limit a current (energization amount) which flows in the brushless motor 2. Likewise, when the torque and the rotating speed of the brushless motor 2 are to be limited, the PWM control is conducted. With the execution of the PWM control, the energization amount of the brushless motor 2 is reduced as compared with that of the 120° energization process, it is possible to limit the current or limit the rotating speed. In FIG. 2, (a2) to (f2) show the switching modes of the switching elements SW1 to SW6 in the PWM control. In FIG. 2, (a2) to (f2) correspond to (a1) to (f1), respectively.

As shown in the figure, two phases that are connected to the switching element that turns on through the 120° energization process are alternately rendered conductive to a higher potential side input terminal (positive electrode of the battery 12) of the power conversion circuit 1 and a lower potential side input terminal (negative electrode of the battery 12). In the respective two phases, the switching elements SW1, SW3, and SW5 of the high side arm and the switching elements SW2 SW4, and SW6 of the low side arm alternately turn on, when one of those two phases is on at the high side arm side whereas the other phase is on at the low side arm side. As a result, a variation of the neutral point potential of the brushless motor 2 is suppressed. Hereinafter, the above operation will be described with reference to FIG. 3.

Figure 3A:
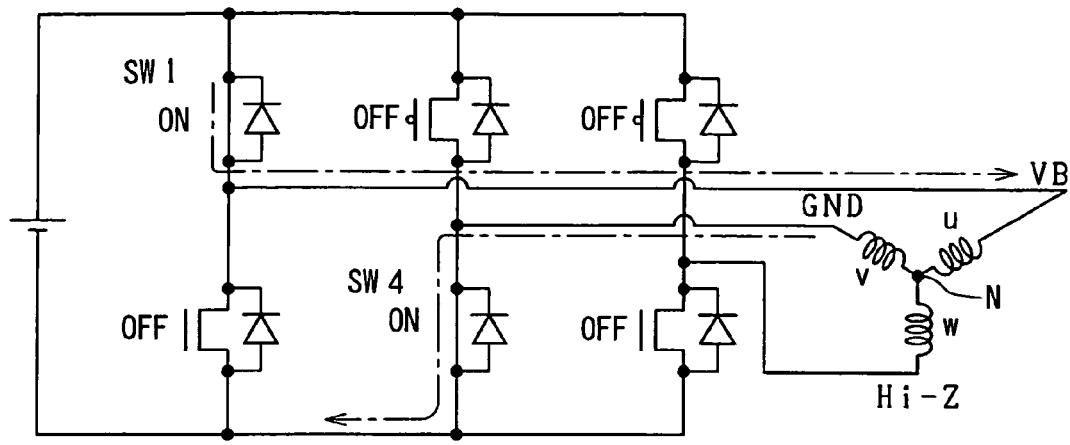
FIGS. 3A and 3B are circuit diagrams showing the advantages of a PWM processing according to the first embodiment.

FIG. 3A exemplifies a case in which the switching element SW1 of the high side arm of the U-phase and the switching element SW4 of the low side arm of the V-phase are turned on in the same switching state as that of the 120° energization method under the PWM control. In this case, the terminal voltage Vu of the U-phase becomes the voltage VB of the battery 12 (more precisely, a value that is higher than the voltage VB by about the voltage drop amount between the source and the drain of the switching element SW1). In this example, the W-phase that is the remaining one phase becomes in a high-impedance state because the switching elements SW5 and SW6 of both of the high side arm and the low side arm are turned off. For this reason, the voltage at the neutral point N of the brushless motor 2 becomes about "VB/2" when an influence of induced voltage is ignored.

Figure 3B:
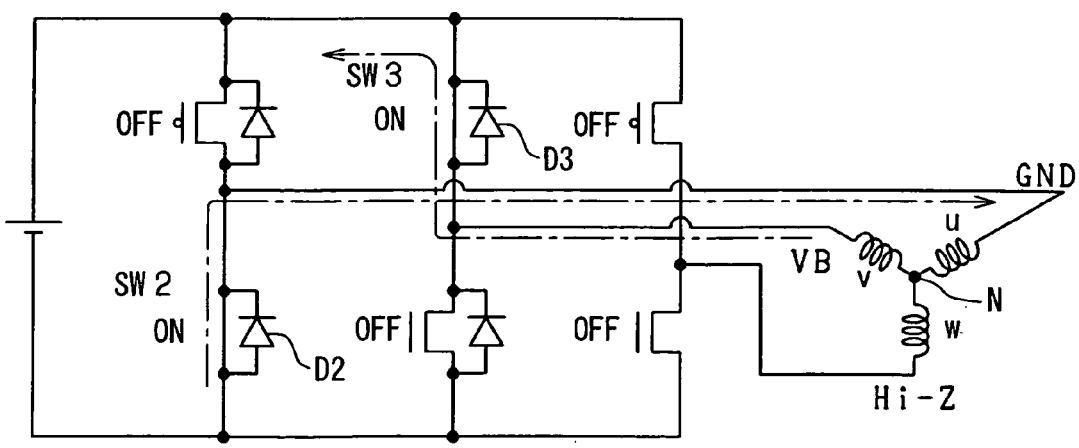

FIG. 3B shows a case in which the switching state is changed over from the state of FIG. 3A under the PWM control. Because the current has flowed into the U-phase before switching, an electromotive force that allows a current of the same direction to flow is developed by the inductor component of the brushless motor 2 even after switching. For this reason, a current flows into the U-phase from the switching element SW2 of the low side arm of the U-phase which newly turns on. In this situation, no current flows into the diode D2 which is connected in parallel to the switch element SW2, because the voltage drop amount between the source and the drain of the switching element SW2 is smaller than the voltage drop amount of the diode D2. On the other hand, in the state of FIG. 3A, because the current flows out of the V-phase, an electromotive force that allows the current of the same direction to flow is developed by the inductor component of the brushless motor 2 even after switching. For this reason, a current flows into the switching element SW3 of the high side arm of the V-phase which newly turns on from the V-phase of the brushless motor 2. In this situation, the reason that no current flows into the diode D3 that is connected in parallel to the switch element SW3 is because the voltage drop amount between the source and the drain of the switching element SW3 is smaller than the voltage drop amount of the diode D2.

In the state shown in FIG. 3B, the terminal voltage Vu of the U-phase becomes the ground potential GND (more precisely, a value that is lower than the ground potential GND by about the voltage drop amount between the source and the drain of the switching element SW4). The terminal voltage Vv of the V-phase becomes the voltage VB of the battery 12 (more precisely, a value that is higher than the voltage VB by about the voltage drop amount between the source and the drain of the switching element SW1). Then, the W-phase that is the remaining one phase becomes the high-impedance state because the switching elements SW5 and SW6 of both of the high side arm and the low side arm are turned off. For this reason, the neutral point voltage of brushless motor 2 becomes about "VB/2" when an influence of induced voltage is ignored. That is, the neutral point voltage before and after switching of FIGS. 3A and 3B hardly changes. For this reason, the PWM processing can be conducted while suitably suppressing the change in the neutral point voltage.

Figure 4A:
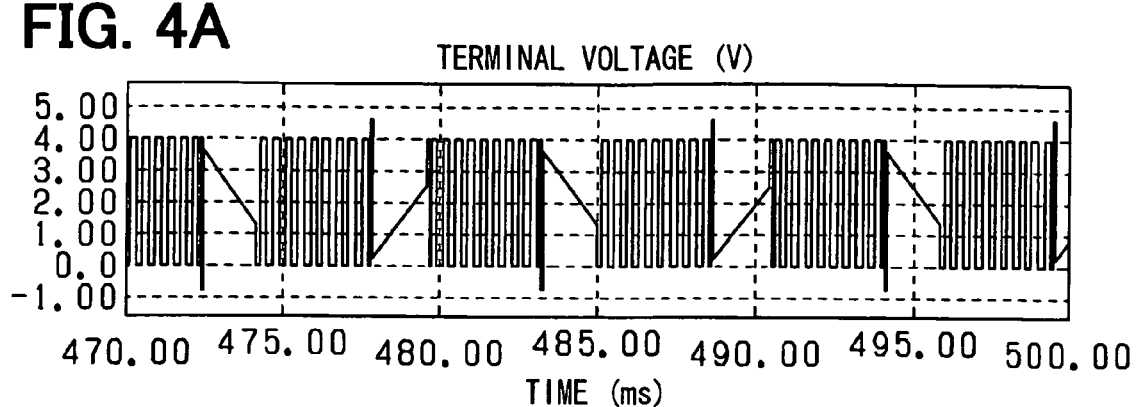
FIGS. 4A to 4D are timing charts showing the simulation results of the PWM processing according to the first embodiment.
Figure 4B:
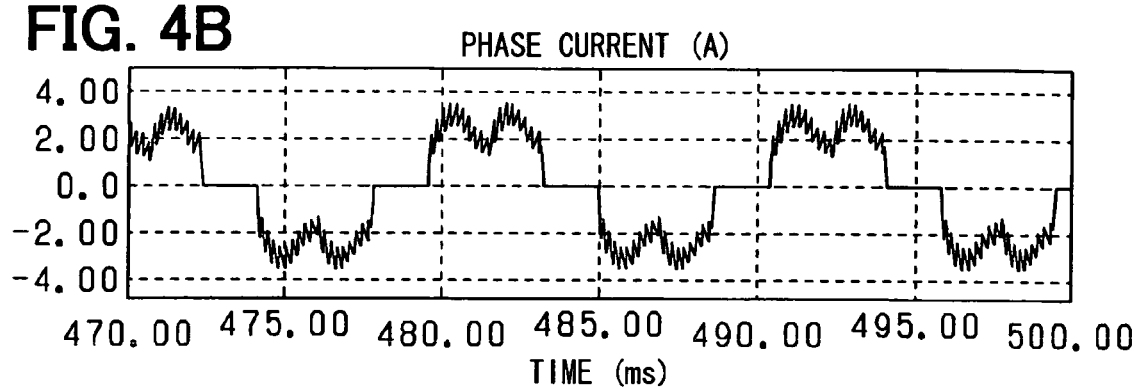
Figure 4C:
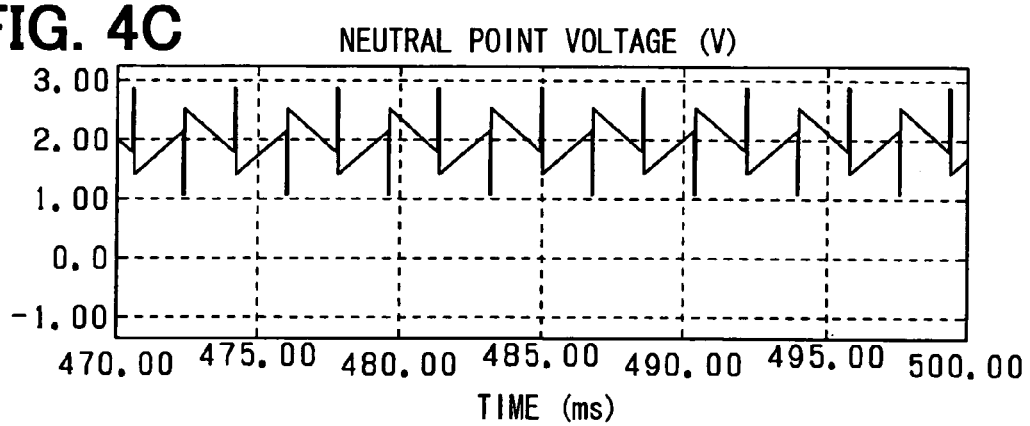
Figure 4D:
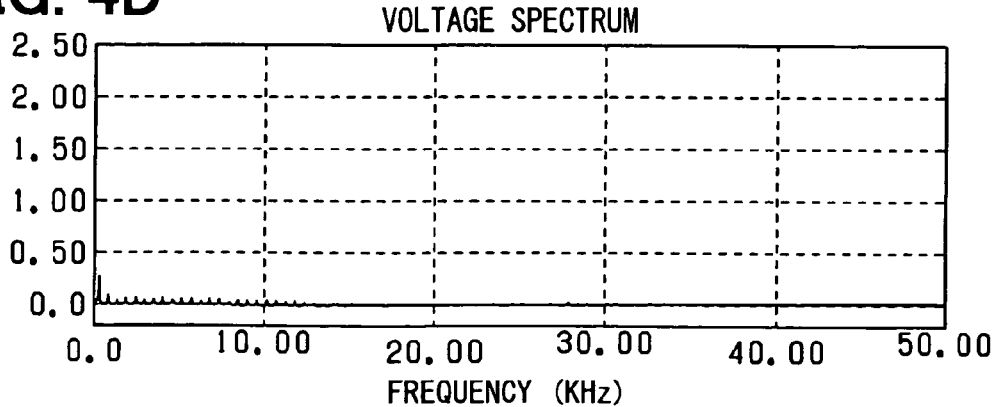

FIGS. 4A to 4D show the result of the PWM processing. Specifically, FIG. 4A shows the transition of a terminal voltage in this case, FIG. 4B shows the transition of a phase current, FIG. 4C shows the transition of the neutral point voltage, and FIG. 4D shows the transition of a voltage spectrum.

As shown in FIG. 4C, the neutral point voltage merely basically smoothly changes according to the induced voltage. For this reason, the neutral point voltage can readily detect the zero-cross timing which is the reference voltage Vr. More specifically, the filter 27 that is sufficiently small in time constant is merely used in FIG. 1, thereby enabling the reference voltage Vr to be stabilized. For this reason, the zero-cross detection circuit 20a can be simply configured. Further, as shown in FIG. 4D, the noise level is also kept low. Accordingly, an event that an AC current flows into an adjacent conductor through the neutral point N of the brushless motor 2 and an insulator under the PWM control can be suitable avoided, and the common mode noise can be suitably suppressed or avoided.

On the contrary, FIGS. 5A to 5D show a case of a comparison example in which the switching element that is in the on-state in the 120° energization process turns on or off. FIGS. 5A to 5D correspond to FIGS. 4A to 4D, respectively.

Figure 5A:
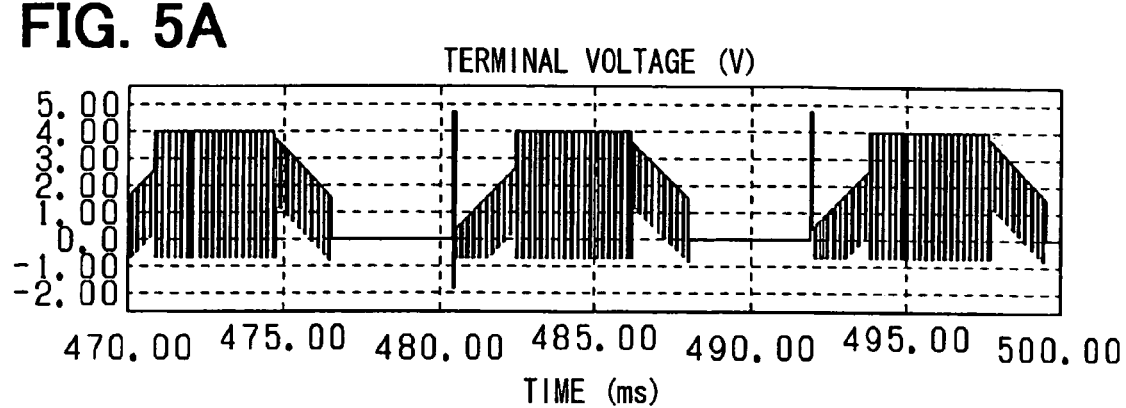
FIGS. 5A to 5D are timing charts showing the simulation results of PWM processing of a comparison example.
Figure 5B:
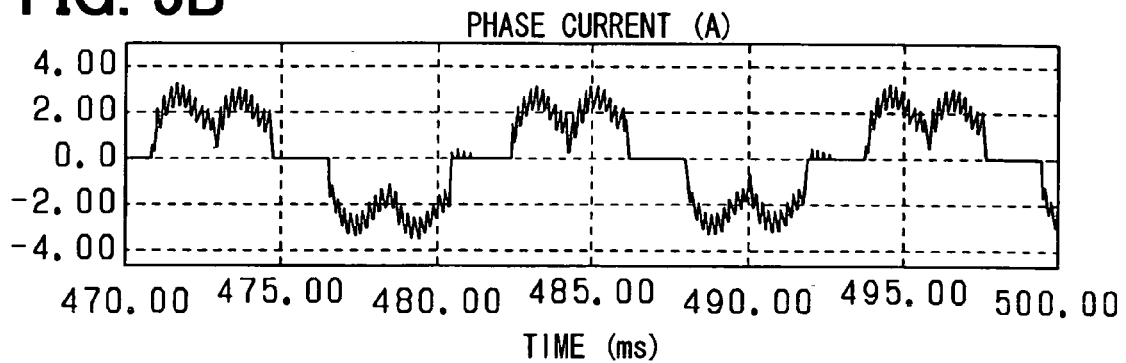
Figure 5C:
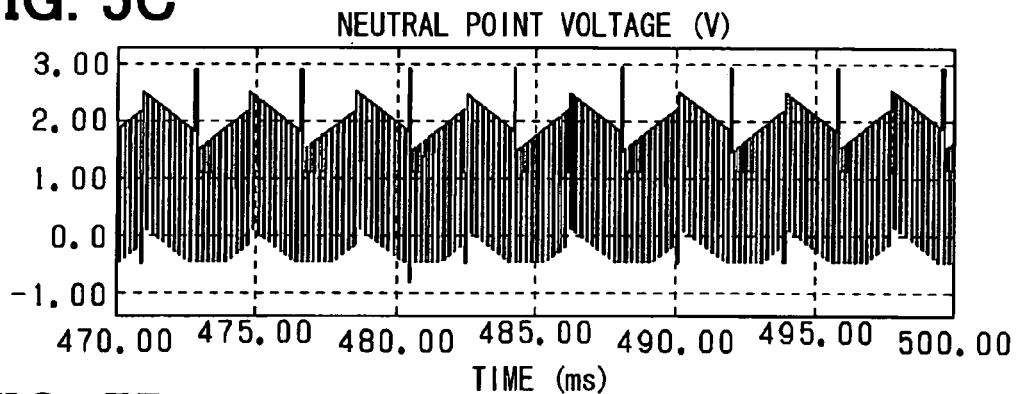
Figure 5D:
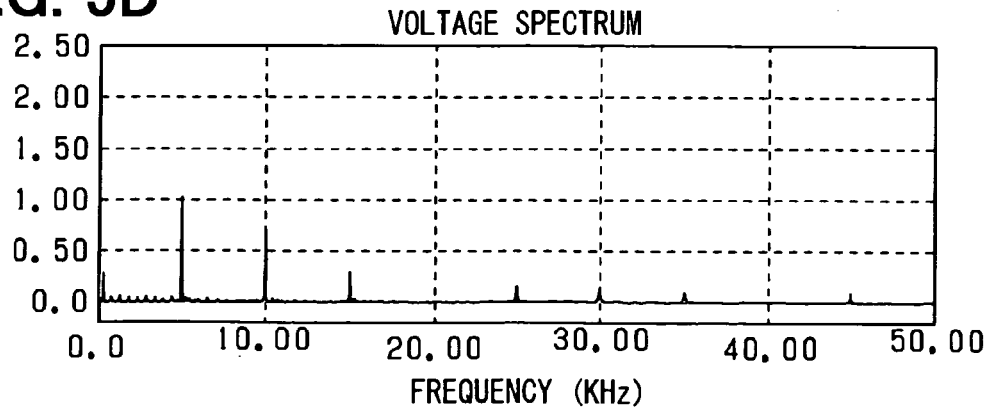
Figure 6A:
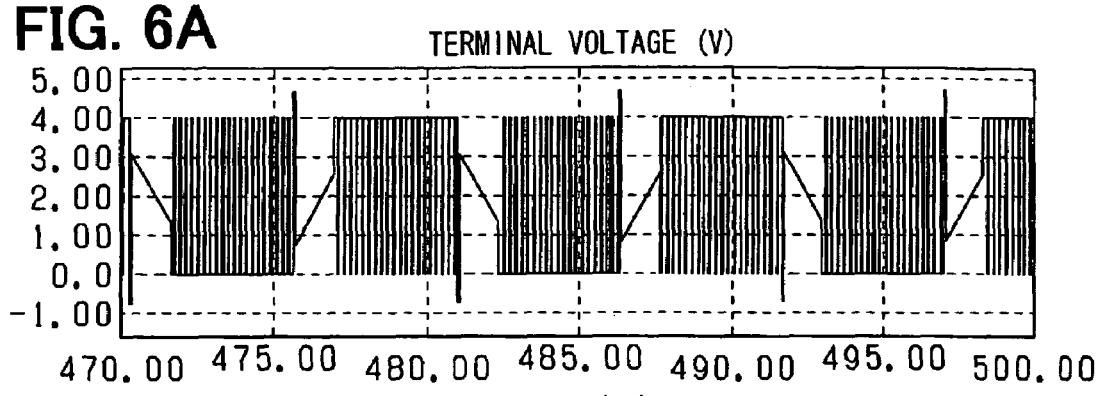
FIGS. 6A to 6D are timing charts showing the simulation results of the PWM processing in a modified example of the above embodiment.
Figure 6B:
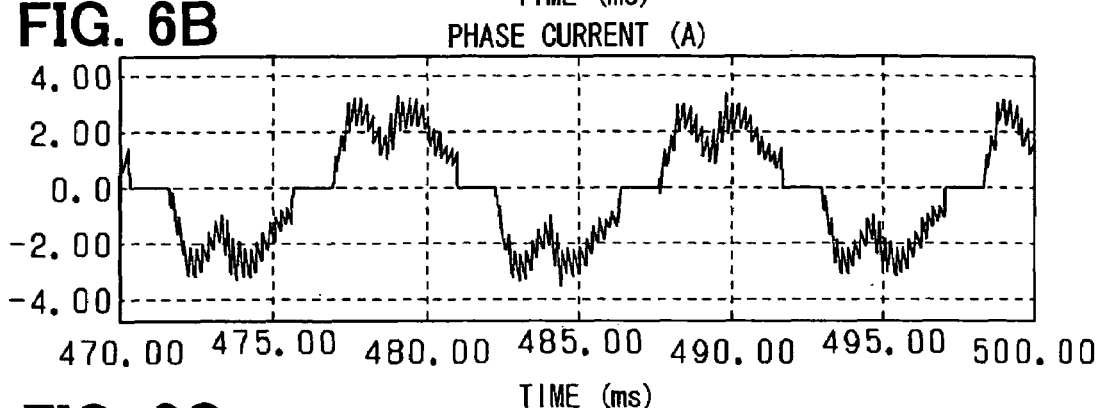
Figure 6C:
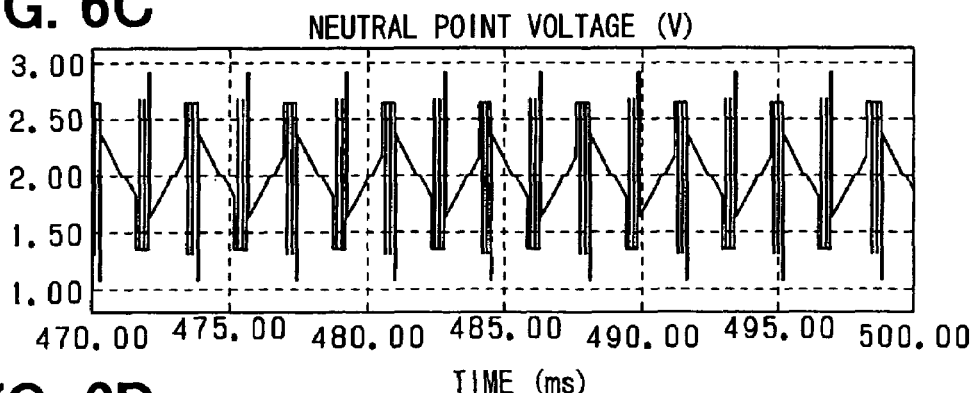
Figure 6D:
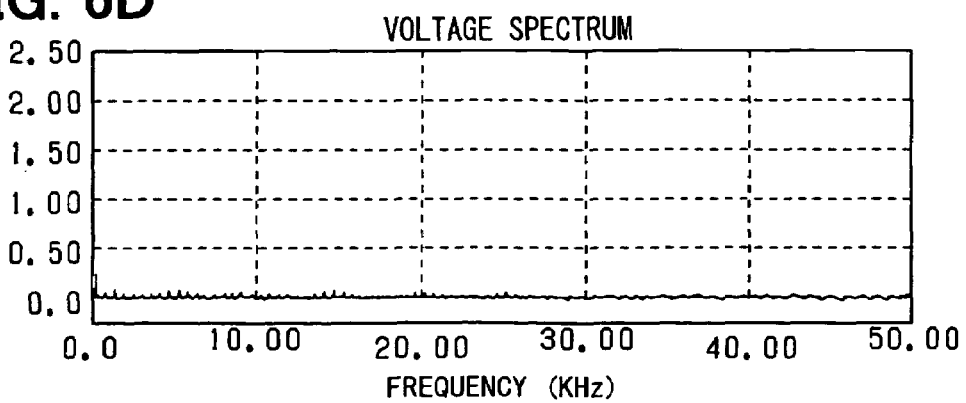

As shown in FIG. 5C, in this case, the neutral point voltage largely varies. For this reason, in order to detect the zero-cross timing, a process for detecting the zero-cross timing such as a process of prohibiting the detecting process of the zero-cross timing during a variation period of the voltage accompanied by switching is complicated. Further, as shown in FIG. 5D, the noises become large. For this reason, with the execution of the PWM control, an AC current flows into an adjacent conductor through the neutral point N of the brushless motor 2 and an insulator under the PWM control, and a common mode noise occurs in the vehicle.

According to this embodiment, the following advantages are provided.

(1) The first phase that is rendered conductive to the high potential side input terminal (positive electrode side of the battery 12) of the power conversion circuit 3 during the 120° energization process, and the second phase that is rendered conductive to the low potential side input terminal (negative electrode side of the battery 12) are alternately rendered conductive to the high potential side input terminal and the low potential side input terminal to conduct the PWM control. As a result, it is possible to suitably suppress the occurrence of the noises under the PWM control.

(2) There is applied a sensorless system that calculates a time required after the zero-cross timing when the induced voltage of the brushless motor 2 becomes the reference voltage Vr till the changeover timing of the operation state of the switching element due to the 120° energization process based on the interval of the zero-cross timing. In this case, when the neutral point voltage largely varies, it is necessary to detect the zero-cross timing while masking the variation. However, according to the PWM control of this embodiment, there does not arise the above problem. For this reason, the brushless motor 2 can be driven by the sensorless system through a simple process.

(3) There is applied the 120° energization process where one revolution angle of the brushless motor 2 is equally divided by all the phases to provide angular intervals, and the voltage of the rectangular waveform is applied to the brushless motor 2 so as not to overlap with each other in each of the phases. As a result, the neutral point voltage can be more suitably stabilized.

(4) There is applied the switching elements SW1 to SW6 in which a pair of terminals (source and drain) allow a current to flow in the two directions. As a result, because the current that flows in the switching elements SW1 to SW6 in the direction opposite to the current flow direction in the 120° energization process under the PWM control, the power loss can be reduced as compared with a case in which that current flows in the diodes D1 to D6.

(Modification of First Embodiment)

The first embodiment can be modified as described below.

The system that applies the voltage of the rectangular waveform to the brushless motor 2 is not limited to the 120° energization process. For example, there can be applied a 130° energization process in which the respective switching elements SW1 to SW6 of the respective phases are turned on every 130°. In this case, in each of the arms, there exists an overlap period where the switching elements SW1, SW3, and SW5 (switching elements SW2, SW4, SW6) of a plurality of phases turn on at the same time, even if the PWM control is conducted by a process that is exemplified by the above embodiment, the neutral point potential is not held as constant as a case shown in FIGS. 6A to 6D. However, even in this case, the effect of reducing the noises was observed.

FIGS. 6A to 6D show a case in which the PWM control is conducted based on the energization process which corresponds to FIGS. 4A to 4D. As is understood from FIG. 6D, the noises are suitably reduced even in that case. On the contrary, FIGS. 7A to 7D show a case in which a conventional PWM control is conducted based on the 1300 energization method.

In this example, FIGS. 7A to 7D correspond to FIGS. 6A to 6D. As shown in the figures, the noises increase as compared with the case shown in FIGS. 6A to 6D. For comparison, in the example shown in FIGS. 6A to 6D, in the overlap period, a phase in which the high side arm is turned on and a phase in which the low side arm is turned on are alternately rendered conductive to the high potential side input terminal and the low potential side input terminal.

The energization control when no PWM control is conducted is not limited to the 120° energization control or the 130° energization control, but may be a control system of the energization angle that is narrower than 120° or a control system of the energization angle that is broader than 130°. In this situation, it is preferable that the system is a control system of the energization angle of "120°±30°". It is preferable that the voltage of the rectangular waveform which is applied to the brushless motor 2 is a voltage of "120°±30°".

The first embodiment and its modification exemplifies a case in which the pulse width modulation is conducted over the entire period of applying the voltage of the rectangular waveform, but is not limited to this configuration. For example, for the purpose of conducting the instantaneous torque control, the pulse width modulation can be conducted on only the end portion of the voltage of the rectangular waveform.

The terminal voltages Vu, Vv, Vw, and the reference voltage Vr can be compared with each other by a microcomputer process instead of the comparators 21, 22, and 23.

The reference voltage Vr may be a voltage corresponding to the neutral point voltage of the brushless motor 2, or "½" of the supply voltage instead of a virtual neutral point voltage.

The detection of the rotation angle by the induced voltage of the brushless motor 2 is not limited to detection of the zero-cross timing based on the induced voltage. For example, the induced voltage that appears in the terminal voltage of the brushless motor 2 may be compared with "½" of the voltage of the battery 12. For example, as disclosed in JP 11-18478A, the timing at which a given electric angle is provided other than the zero-cross timing can be detected based on the induced voltage. Even in this case, the sensorless processing can be easily conducted by using the manner of the present invention which is capable of suppressing the variation of the neutral point voltage and the virtual neutral point voltage of the brushless motor 2.

The present embodiment is not limited to a sensorless system in which the rotation angle information of the brushless motor 2 is acquired based on the induced voltage, and the switching elements SW1 to SW6 are operated based on the rotation angle information. For example, even when there is provided rotation angle detecting part such as a Hall element, the application of the present embodiment is effective in reduction of the noises caused by the PWM processing.

The switching elements SW1 SW3, and SW5 of the high side arm can be formed of n-channel MOS field effect transistors.

The switching element that allows a current to flow bi-directionally is not limited to the MOS field effect transistors. For example, the switching element can be an MIS field effect transistor. Also, the switching element is not limited to the field effect transistor.

The switching elements SW1 to SW6 are not limited to an element whose pair of terminals (drain and source) allows a current to flow bi-directionally, but may be, for example, an insulated gate bipolar transistor (IGBT).

A power supply that is connected with the brushless motor 2 is not limited to the battery 12, but may be a general power supply that generates substantial DC such as DC that is generated by a rectifier from a power generator or an AC power supply.

The brushless motor 2 is not limited to an actuator of an in-vehicle fuel pump, but may be, for example, a motor for in-vehicle cooling fan. Further, the brushless motor 2 may be a motor for home appliance such as a refrigerator or a washer.

The rotating machine is not limited to the three-phase brushless motor, but may be other multiphase electric motors.

(Second Embodiment)

Figure 8:
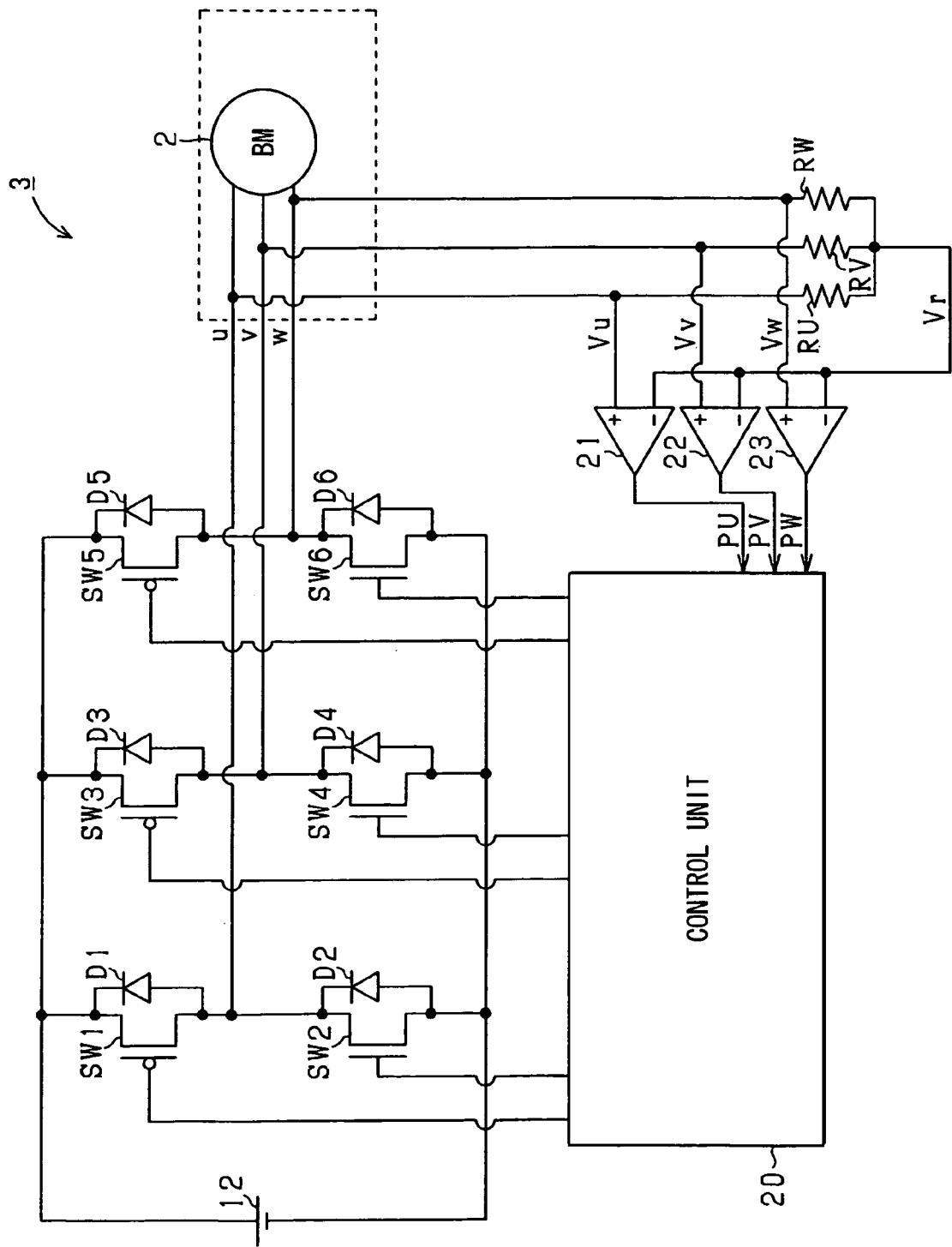
FIG. 8 is a system circuit diagram showing a second embodiment of the present invention.

In the second embodiment, shown in FIG. 8, a power conversion circuit 3 is constructed in the same manner as in the first embodiment, and a control unit 20 controls a brushless motor 2 by operating the power conversion circuit 3. In this example, switching control is basically conducted through a 120° energization method. Specifically, a timing (zero-cross timing) at which an induced voltage becomes the neutral point voltage (reference voltage Vr) of the brushless motor 2 is detected by a timing at which the induced voltage appears in the terminal voltages Vu, Vv, and Vw of the respective phases of the brushless motor 2. It is assumed that the reference voltage Vr is provided by dividing the terminal voltages Vu, Vv, and Vw of the respective phases of the brushless motor 2 by resistive elements RU, RV, and RW. It is assumed that the zero-cross timing is an inversion timing of the output of comparators 21, 22, and 23 that compare the terminal voltages Vu, Vv, and Vw of the respective phases with the reference voltage Vr. The operation of the switching elements SW1 to SW6 changes over at a timing (regulation timing) which is delayed from the zero-cross timing by a given electric angle (for example, 30°).

When the PWM control is so conducted as to limit a current (energization amount) that flows in the brushless motor 2 when the current that flows in the brushless motor 2 exceeds a current limit value. The PWM control is conducted by prohibiting the on-operation when the current exceeds the current limit value even within a period of 120° during which the switching elements SW1 to SW6 turn on through the 120° energization method as an on-operation permissible period. The control unit 20 may be formed of a logic circuit, or may be formed of a programmed computer including a central processing unit and a memory that stores a control program, etc. therein.

The induced voltage of the brushless motor 2 is developed with the rotation of the brushless motor 2. For this reason, in a sensorless system that drives the brushless motor 2 while grasping the rotation angle based on the induced voltage of the brushless motor 2, there arises such a problem about how the initial value of the rotation angle is provided when the brushless motor 2 starts from a state in which the rotating speed of the brushless motor 2 is extremely low. For this reason, when the brushless motor 2 starts, an energization process from a specific phase to another phase is conducted twice while changing the phase, to thereby control the rotor to a specific position (angle). In this way, the rotation angle is controlled to a final rotation angle (second positioning target angle) by two energization processes. For this reason, the rotation angle of the brushless motor 2 can be controlled to the final rotation angle even if the rotation angle of the rotor before the energization process starts is an uncontrollable angle (in the vicinity of a dead point) at which the rotor cannot be changed depending on the energization process (second positioning process) for controlling the rotation angle to the final rotation angle.

Figure 9:
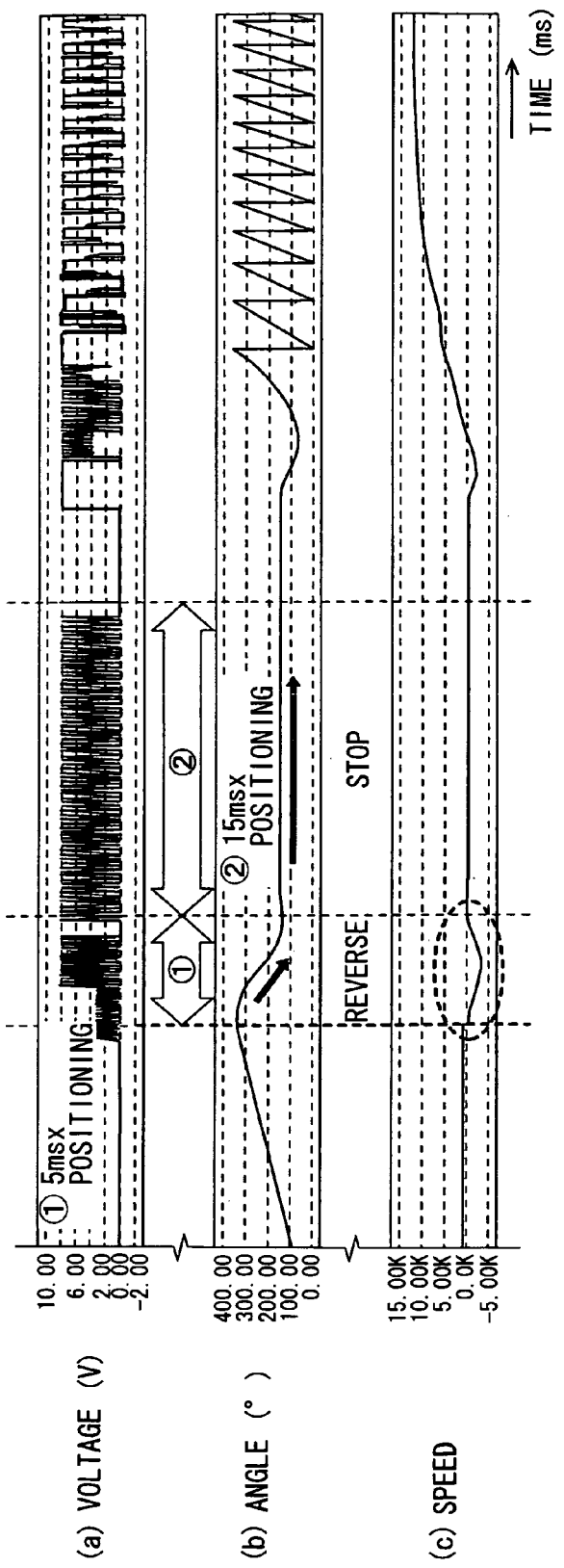
FIG. 9 is a timing chart showing a problem in a positioning process.

However, in an in-vehicle fuel pump as in this embodiment, it is likely that the internal combustion engine fails to start because fuel cannot be supplied to the internal combustion engine unless the positioning process is rapidly conducted. For this reason, it is preferable to conduct the positioning process as quick as possible. From the above viewpoint, it is proposed that the first energization process (first positioning process) for positioning is terminated before the rotor of the brushless motor 2 stops, and shifted to the second positioning process. However, in this event, if the rotation angle is in the vicinity of the dead point when the first positioning process is shifted to the second positioning process, it is likely that the target angle cannot be controlled to the second positioning target angle. In FIG. 9, (a) shows the transition of a terminal voltage, (b) shows the transition of the electric angle, and (c) shows the transition of the rotating speed.

As shown in the figure, if the rotation angle of the brushless motor 2 is in the vicinity of the dead point when the first positioning process is shifted to the second positioning process, the rotating speed cannot be changed by the second positioning process. For this reason, in this case, because the rotation angle must be changed through a start process after positioning, the start property is deteriorated.

Under the above circumstances, a first positioning time (first required time T1) and a second positioning time (second required time T2) are adjusted in a mode shown in FIGS. 10A and 10B. FIG. 10A shows the setting mode of a first required time T1. As shown in the figure, when the first positioning process is conducted, the rotation angle (solid line) of the brushless motor 2 is converged to the first positioning target angle while the first positioning target angle (dashed two-dotted line) is mainly being damped and oscillated. In this example, a curve indicated by a pair of broken lines is directed to a pair of envelop curves which is a pair of curves that connect the maximum and minimum of the rotation angle which is conducted by the first positioning process. It is possible to shift the first positioning target angle to the second positioning target angle when the first positioning process is shifted to the second positioning process while a time when the dead point does not exist elapses within a region that is surrounded by the pair of envelop curves. For this reason, the time when the envelop curves do not include the dead point is called a first required time T1.

FIG. 10B shows the setting mode of the second required time T2. As shown in the figure, when the second positioning process is conducted, the rotation angle (solid line) of the brushless motor 2 is converged to the second positioning target angle while the second positioning target angle (dashed line) is mainly being damped and oscillated. In this example, in the figure, a curve indicated by a pair of broken lines is directed to a pair of envelop curves which is a pair of curves that connect the maximum and minimum of the rotation angle which is conducted by the second positioning process. It is possible to suitably start the brushless motor 2 when a region that is surrounded by the pair of envelop curves becomes a region (second positioning target region) where the start process of the brushless motor 2 can be appropriately conducted. Under the above circumstances, in this embodiment, it is assumed that a time when the region surrounded by the envelope curves coincides with the second positioning target region is called a second required time T2.

It is preferable that the second positioning target region has a width that is equal to or lower than an adjacent rotation angle interval of rotation angles which are assumed to be fixed when it is centered on the second positioning target angle, and six kinds of energization from one of two arbitrary phases to another phase of the brushless motor 2 is continued, respectively. It is more preferable that the target region is set to a region where a time required until the start has been completed can be equal to or lower than a given time by measuring a relationship between the time required till the start completion of the brushless motor 2 and the rotation angle as the initial condition in advance.

For comparison, the second required time T2 is set to be longer than the first required time T1.

Figure 11:
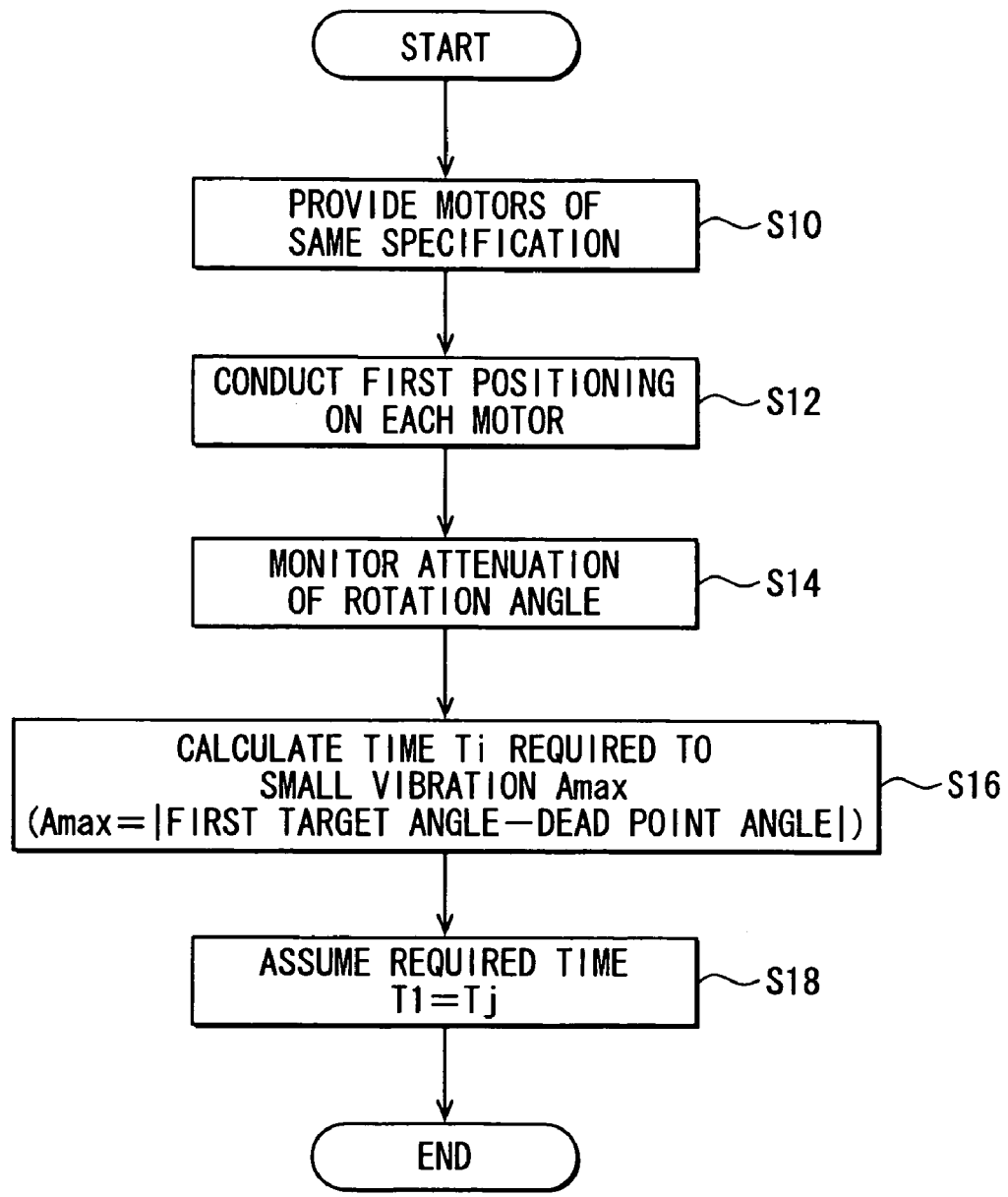
FIG. 11 is a flowchart showing the procedure of a process for adjusting a first positioning time according to the second embodiment.

FIG. 11 shows a process for adjusting the first required time T1 according to this embodiment. This process is conducted before the product of the control unit 20 of the brushless motor 2 is shipped.

In the above series of processing, first in S10, a plurality of brushless motors 2 of the object specification are prepared. In this example, it is preferable that an individual difference that is permitted as the product is reflected. That is, it is preferable that the products include a product of upper limit variation and a product of lower limit variation with respect to the inertia of the rotors. In subsequent S12, the first positioning process is conducted on the respective brushless motors 2 thus prepared. As a result, the rotation angle of the brushless motor 2 is damped and vibrated about the first positioning target angle. In subsequent S14, the attenuation of the rotation angle of the brushless motor 2 is monitored. In subsequent S16, in the respective brushless motors 2 that are labeled with "i", a time Ti when the amplitude of the variation becomes lower than an upper limit value Amax is calculated. In this example, the upper limit value Amax is a rotation angle between the dead point of the second positioning process and the first positioning target angle. This process calculates the time Ti corresponding to the first required time T1 shown in FIG. 10A with respect to the respective brushless motors 2.

In subsequent S18, it is assumed that a time Tj of a specific brushless motor 2 (labeled with "j") is a first required time T1. In this example, it is preferable that the time Tj is about the maximum value among the time Ti that is calculated in S16.

Figure 12:
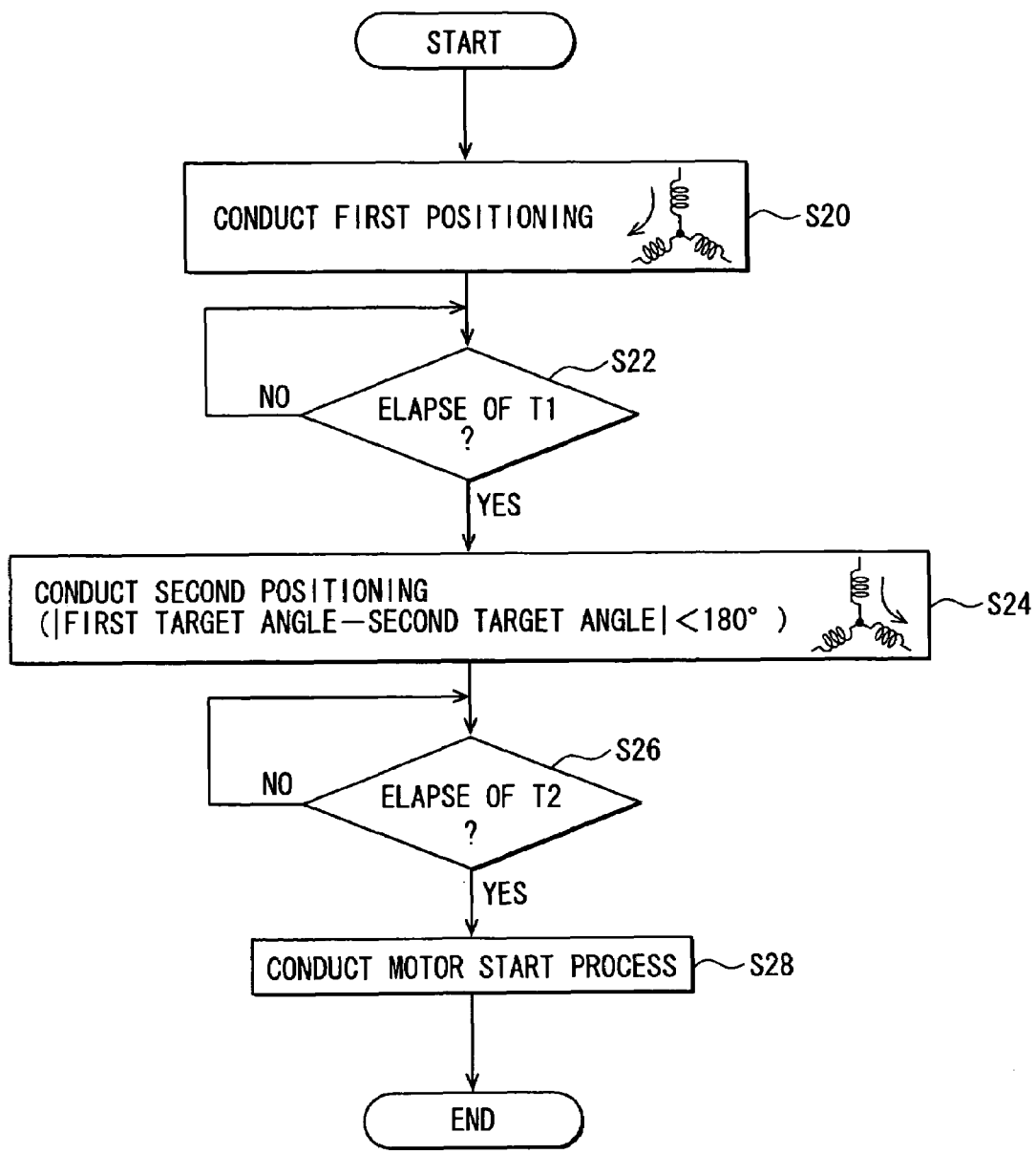
FIG. 12 is a flowchart showing the procedure of a positioning process according to the second embodiment.

As shown in FIG. 12, a start process of the brushless motor 2 according to this embodiment is conducted so that the first required time T1 and the second required time T2 are set. This process is repetitively executed by the control unit 20, for example, in a given cycle.

In the series of processing, first in S20, energization is conducted from one specific phase to another phase to conduct the first positioning process. Then, when the first required time T1 is elapsed (yes in S22), the second positioning process is conducted in S24. In this example, an absolute value of a difference between the first positioning target angle and the second positioning target angle is so set as to be lower than 180°. This setting is based on a fact that the dead point of the second positioning process is the position of 180° from the second positioning target angle. Then, when the second given time T2 is elapsed (yes in S26), the brushless motor 2 starts in S28.

As described above, in this embodiment, because the second positioning process is conducted after the first given time T1 has been elapsed, it is possible to appropriately control the rotation angle to the second positioning target angle by the second positioning process. Further, the rotation angle is converged within the second positioning target range to change over to the start process. As a result, the start can be rapidly conducted as compared with a case in which the brushless motor 2 starts after the brushless motor 2 stops at the second positioning target angle although the brushless motor 2 appropriately starts.

According to the second embodiment, the following advantages are provided.

(1) A time during which the first positioning process is conducted (first required time T1) is made longer than a time during which it is assumed that the angle interval between the first positioning target angle and the dead point of the second positioning process coincides with the amplitude of the variation of the rotation angle. As a result, the target angle can be surely controlled to the second positioning target angle by the second positioning process.

(2) The first given time T1 is set based on a fact that the damping degree of the variation of the rotation angle when the plural brushless motors 2 are provided and subjected to the first positioning process is actually measured. As a result, the first given time T1 can be appropriately adjusted.

(3) The first given time T1 is set based on a time Ti during which the amplitude of the variation of the rotation angle becomes smaller than the angle interval between the first positioning target angle and the dead point of the second positioning process. As a result, the first given time T1 can be more appropriately set.

(4) The positioning process is conducted by two energization processes. As a result, the process of the minimum number required to surely control the target angle to the final angle can be achieved, and a time required to start the brushless motor 2 can be shortened as much as possible.

(5) The second required time T2 is set to be longer than the first required time T1. As a result, the brushless motor 2 can appropriately start.

(6) The second required time T2 is set so that the variation range of the rotation angle falls within the second positioning target range. As a result, the start process that is conducted subsequently to the second positioning process can be appropriately conducted.

(Third Embodiment)

Figure 13:
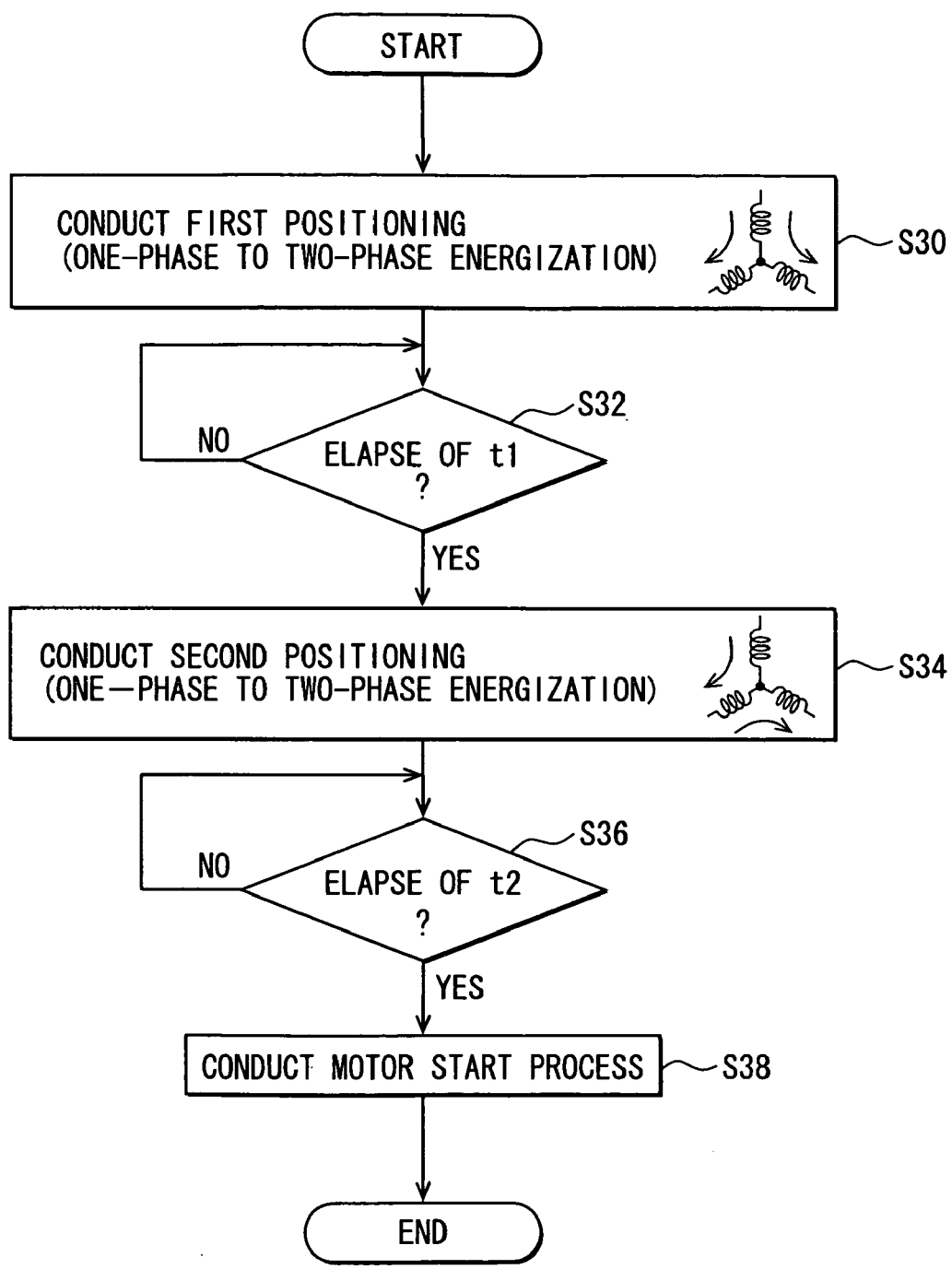
FIG. 13 is a flowchart showing the procedure of a positioning process according to a third embodiment of the present invention.

In the third embodiment, the start process of the brushless motor 2 is conducted repetitively by the control unit 20, for example, in a given cycle, as shown in FIG. 13.

In the series of processing, the first positioning process is conducted first in S30. The first positioning process controls the target angle to the first positioning target angle by allowing a current to flow from one specific phase of the brushless motor 2 to the remaining two phases. According to the above energization method, because a force for reducing a phase displacement of the rotation angle of the brushless motor 2 from the first positioning target angle is exerted, it is possible to reduce the convergence time on the first positioning target angle. For this reason, the time (first required time t1) during which the first positioning process is conducted is adjusted based on a time during which the amplitude of the variation of the rotation angle is shorter than the angle interval between the first positioning target angle and the dead point of the second positioning process as in the second embodiment, and the first required time t1 can be made shorter than the first required time T1.

When the execution time of the first positioning process reaches the first required time t1 (yes in S32), the second positioning process is conducted in S34. In this process, a current flows from one specific phase of the brushless motor 2 to the remaining two phases to control the target angle to the second positioning target angle. The first positioning process and the second positioning process are different from each other in the energization mode. Then, when the second required time t2 (< second required time T2) is elapsed (yes in S36), the brushless motor 2 starts in S38.

According to the third embodiment, the following advantages are further provided in addition to the advantages of the second embodiment.

(7) The first positioning process is conducted for energizing the remaining two phases from one phase of the brushless motor 2. As a result, the convergence time on the first positioning target angle can be reduced.

(8) The second positioning process is conducted for energizing the remaining two phases from one phase of the brushless motor 2. As a result, the convergence time on the second positioning target angle can be reduced.

(Fourth Embodiment)

Figure 14:
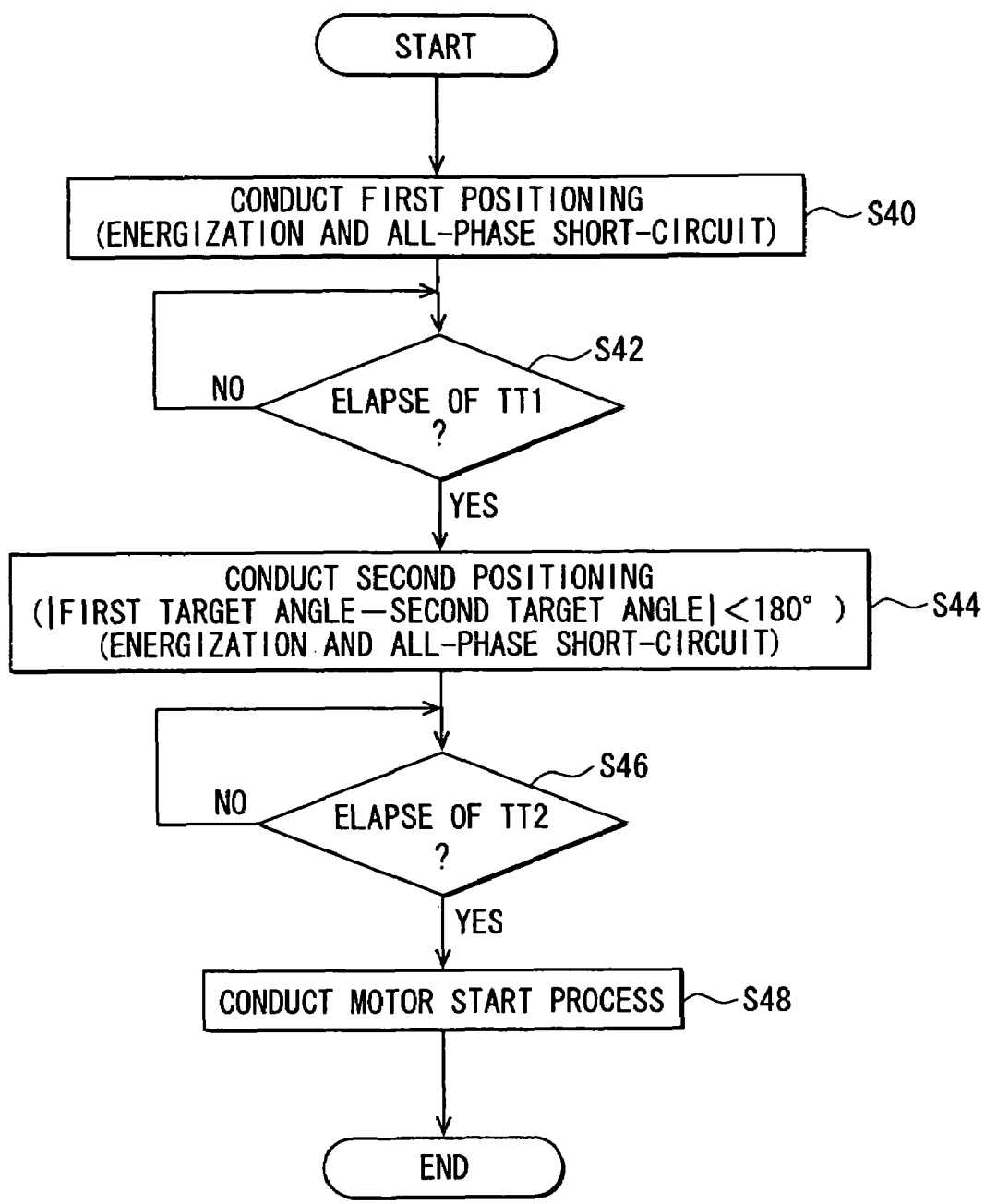
FIG. 14 is a flowchart showing the procedure of a positioning process according to a fourth embodiment of the present invention.

In the fourth embodiment, as shown in FIG. 14, the start process of the brushless motor 2 is repetitively executed by the control unit 20, for example, in a given cycle.

In the series of processing, the first positioning process is conducted first in S40. In the first positioning process according to this embodiment, subsequent to the energization process shown in the above second embodiment, all of the switching elements SW1, SW3, and SW5 of the high side arm or all of the switching elements SW2, SW4, and SW6 of the low side arm are turned on, to thereby short-circuit all of the phases of the brushless motor 2. According to the all-phase short-circuit process, a current flows into the brushless motor 2 due to the induced voltage caused by the rotation of the brushless motor 2, and the current is damped by an influence such as a resistor within the current path.

Specifically, the rotation energy is damped. As a result, the convergence time on the first positioning target angle can be reduced. For this reason, in this embodiment, the first required time TT1 during which the first positioning process is conducted is adjusted based on a time during which the amplitude of the variation of the rotation angle is shorter than the angle interval between the first positioning target angle and the dead point of the second positioning process as in the second embodiment, and the first required time TT1 can be made shorter than the first required time T1.

When the execution time of the first positioning process reaches the first required time TT1 (yes in S42), the second positioning process is conducted in S44. Similarly, in this process, subsequent to the energization process shown in the second embodiment, all of the switching elements SW1, SW3, and SW5 of the high side arm or all of the switching elements SW2, SW4, and SW6 of the low side arm are turned on, to thereby short-circuit all of the phases of the brushless motor 2. Then, when the second required time t2 (< second required time T2) is elapsed (yes in S46), the brushless motor 2 starts in S48.

According to the fourth embodiment, the following advantages are further provided in addition to the above respective advantages of the second embodiment.

(9) The first positioning process includes two processes of the process for energizing another phase from one specific phase of the brushless motor 2, and the all-phase short-circuit process. As a result, the convergence time on the first positioning target angle can be reduced.

(10) The second positioning process includes two processes of the process of energizing another phase from one specific phase of the brushless motor 2, and the all-phase short-circuit process. As a result, the convergence time on the second positioning target angle can be reduced.

(Modification to Second to Fourth Embodiments)

The second to the fourth embodiments can be modified and implemented as follows.

In the fourth embodiment, each of the first positioning process and the second positioning process includes the all-phase short-circuit process. However, the all-phase short-circuit process can be provided in any one of the first and second positioning processes. In this case, it is preferable that the required time is set to the value in the second embodiment in a process having no all-phase short-circuit process.

Similarly, in the first positioning process or the second positioning process according to the third embodiment, the period during which the all-phase short-circuit process is conducted can be provided instead of conducting the energization process over all of the required time. In this case, it is preferable that the first required time T1 or the second required time T2 is made shorter than that in the second embodiment.

Figure 15A:
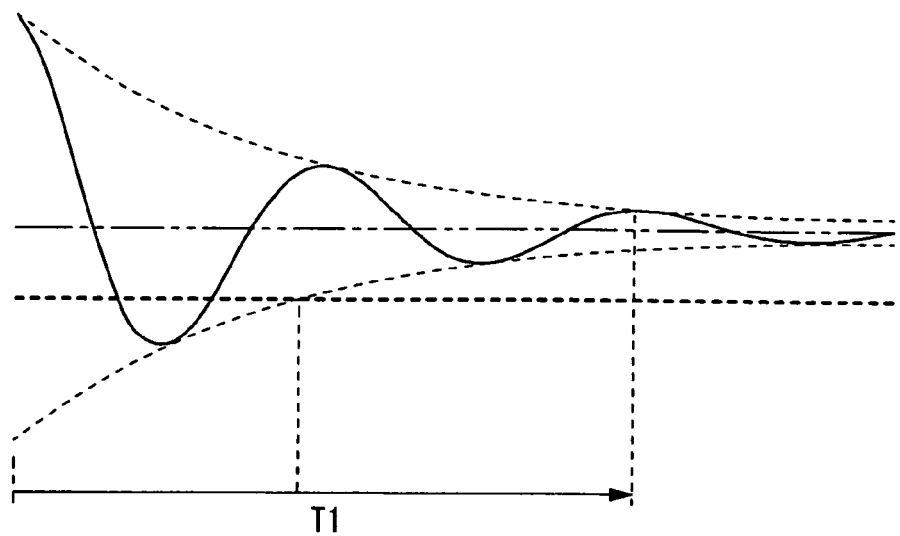
FIGS. 15A and 15B are timing charts showing a manner of adjusting a first positioning time according to a modified example of the second to the fourth respective embodiments.

In the second to the fourth embodiments, in each of the brushless motors 2, a time during which the amplitude of the variation of the rotation angle due to the first positioning process is lower than the angle interval between the target angle of the first positioning process and the dead point of the second positioning process is measured. A specific measured value (a value of about maximum value) which is determined according to a statistical distribution of those measured values is set as the first required time T1. However, for example, a value resulting from adding the time of one cycle of the variation to the minimum value can be set as the first required time T1. As a result, as shown in FIG. 15A, the brushless motor 2 of the quickest convergence can be rapidly started, because the process can be shifted to the second positioning process before the rotation angle is fixed although the quickest convergence does not already reach the dead point before one cycle with respect to the required time.

Figure 15B:
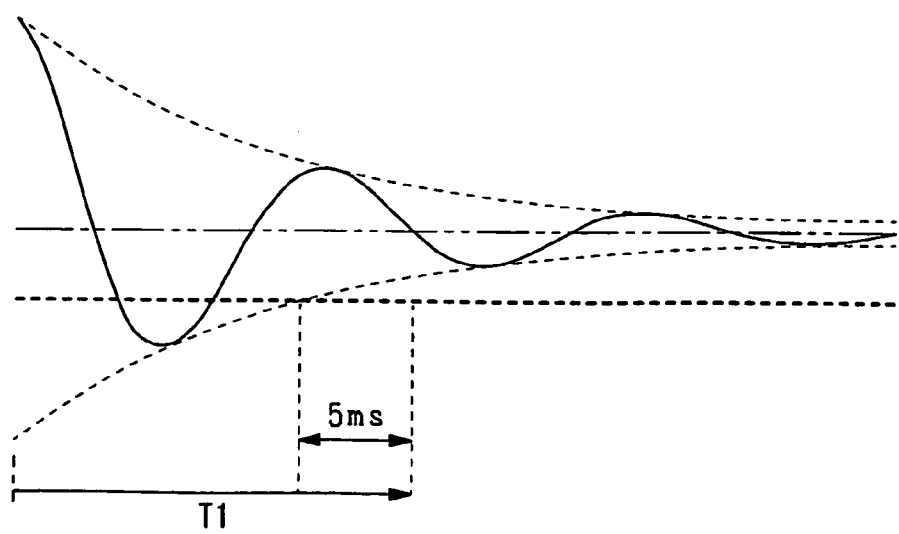

For example, a value provided by adding 5 ms to the minimum value can be set as the first required time T1. As a result, as shown in FIG. 15B, the brushless motor 2 of the quickest convergence can be rapidly started, because the process can be shifted to the second positioning process before the rotation angle is fixed although the quickest convergence does not already reach the dead point before "5 ms" with respect to the first required time T1.

The setting of the first required time T1 is not limited to the first require time T1 based on a value of about the maximum value of the statistical distribution, or the minimum value thereof. For example, the first required time T1 can be determined by adding the half cycle of the variation or 2.5 ms to a time which is lower than the angle interval in the product having the average characteristic (center characteristic). As a result, it is expected that the dead point is not produced when all of the mass-produced brushless motors 2 are shifted from the first positioning process to the second positioning process. Because the maximum value of the delay time of the shift timing with respect to the time that is lower than the angle interval can be set to about one cycle of the variation or about 5 ms, the brushless motor 2 can rapidly start.

The brushless motor 2 is not limited to an actuator which is mounted on a fuel pump, but may be, for example, an actuator of a fan which cools a radiator of an in-vehicle internal combustion engine. Further, the brushless motor 2 may be a data recording device or a reproduction device which is equipped in an in-vehicle navigation system, that is, an electric motor provided in a data recording device or a reproduction device of the disc medium such as a DVD (digital versatile disc), a CD-ROM (compact disc read only memory), or a hard disc. Also, the rotating machine is not limit to the motor, but may be a power generator. Further, the fan is not limited to what is mounted in the vehicle.

The power supply is not limited to the battery 12, but may be, for example, a power generator that converts the rotation energy of the in-vehicle internal combustion engine into an electric energy.

(Fifth Embodiment)

Figure 16:
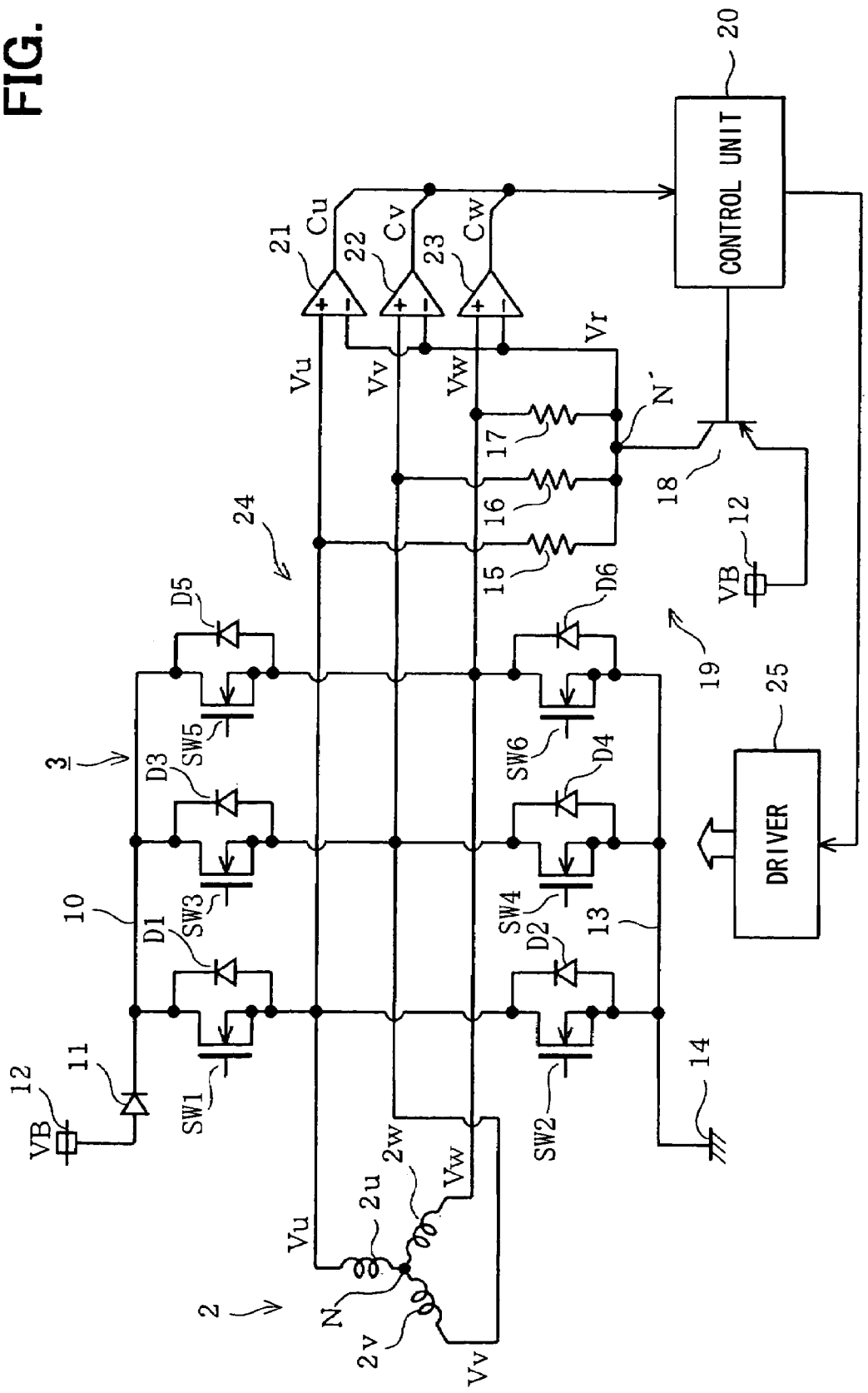
FIG. 16 is a circuit diagram showing a fifth embodiment of the present invention.

In the fifth embodiment, as shown in FIG. 16, a control system sequentially energizes stator windings 2u, 2v, and 2w of a brushless DC motor 2 of three-phases while ensuring the one phase open (not energized) through a 120° energization method, and detects a position of a rotor (not shown) based on an induced voltage that appears in the terminal voltages Vu, Vv, and Vw of the open phase to conduct sensorless driving.

A power conversion circuit 3 that functions as energizing part includes switching elements (MOSFETs) SW1, SW3, and SW5 that form high side arms, and switching elements SW2, SW4, and SW6 that form low side arms. The switching elements SW1 to SW6 are equipped with flywheel diodes D1 to D6, respectively. A DC power wire 10 of the power conversion circuit 3 is connected to a battery 12 through a diode 11, and a DC power wire 13 of the power conversion circuit 3 is connected to the ground 14. The power wires 12 and 14 supply a battery voltage VB.

Resistors 15, 16, and 17 generate a virtual neutral point voltage, one ends of the resistors 15, 16, and 17 are connected to the output terminals of the power conversion circuit 3, respectively, and the other ends thereof are commonly connected to form a virtual neutral point N'. The virtual neutral point voltage has an amplitude level within a change range of the induced voltages that appear in the terminal voltages Vu, Vv, and Vw, and is suitable for detection of the change timing of the induced voltage. A pnp type transistor 18 is connected between the battery 12 and the virtual neutral point N'. Reference voltage generating circuit 19 is formed by the resistors 15, 16, 17, the transistor 18, and a control unit 20.

Comparators 21, 22, and 23 compare the terminal voltages Vu, Vv, and Vw that are developed directly from the output terminal of the power conversion circuit 3 with a reference voltage Vr (virtual neutral point voltage or VB) that is generated in the virtual neutral point N' to output respective comparison signals Cu, Cv, and Cw. Detection wires from the output terminals of the power conversion circuit 3 to the respective comparators 21, 22, and 23 function as voltage detecting part 24. When the output voltage of the power conversion circuit 3 is divided to detect the terminal voltages Vu, Vv, and Vw, the divider circuit functions as the voltage detecting part 24.

The control unit 20 is formed of a microcomputer, and executes control program that is stored in a memory (not shown) to operate as the PWM signal generating part, the mask signal generating part, the reference voltage generating part (a part thereof), the control part, and the energizing part (a part thereof). The energization signals that are output from the control unit 20 are supplied to the gates of the switching elements SW1 to SW6 through a driver 25.

Figure 17:
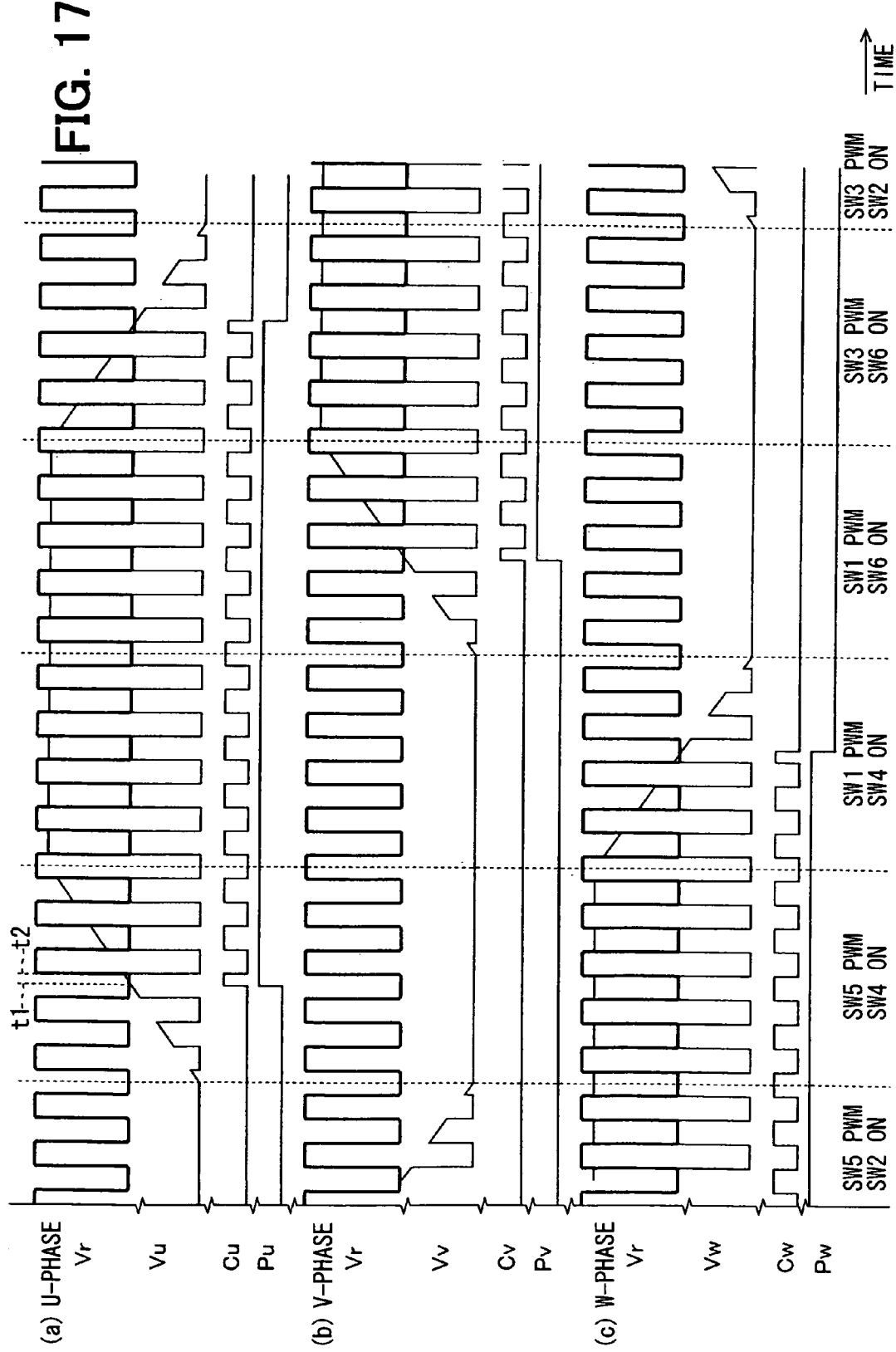
FIG. 17 is a waveform diagram showing signals applied to a U-phase, a V-phase, and a W-phase according to the fifth embodiment.

FIG. 17 shows, in each of (a) U-phase, (b) V-phase, and (c) W-phase, reference voltage Vr (common in the respective phases), the terminal voltages Vu, Vv, and Vw, the comparison signals Cu, Cv, and Cw, and position signals Pu, Pv, and Pw. The control unit 20 executes, for example, the rotation speed control calculation, and generates a PWM signal having a duty ratio corresponding to the magnitude of the output voltage. The PWM signal has an on-state (H level) in which the supply voltage is applied to the stator windings 2u, 2v, and 2w, and an off-state (L-level) in which the supply voltage is blocked off from the stator windings 2u, 2v, and 2w.

The control unit 20 as control part and the energizing part displaces the position signals Pu, Pv, and Pw which will be described later by 30°, respectively, to generate commutation signals, and energizes the low side arms of the respective phases by 120° in turn based on the commutation signals. Also, the control unit 20 PWM-drives the high side arms of the respective phases by 120° in turn based on the energization signal that is generated by AND-logic operation on the commutation signal and the PWM signal. In the 120° energization method, one of three phases is an open phase with a width of 60°, and an induced voltage is developed in the terminal voltage of the open phase.

In a period where the PWM signal is on (H level), the supply voltage VB−Vf (Vf is a forward voltage of the diode 11) is applied between the terminals of the stator windings of any two phases through the switching element of the high side arm and the low side arm. On the other hand, in a period where the PWM signal is off (L level), the power supply is blocked off, and a current flows back to the stator windings of any two phases through the switching elements and the flywheel diodes of the low side arm.

Figures 18, 19:
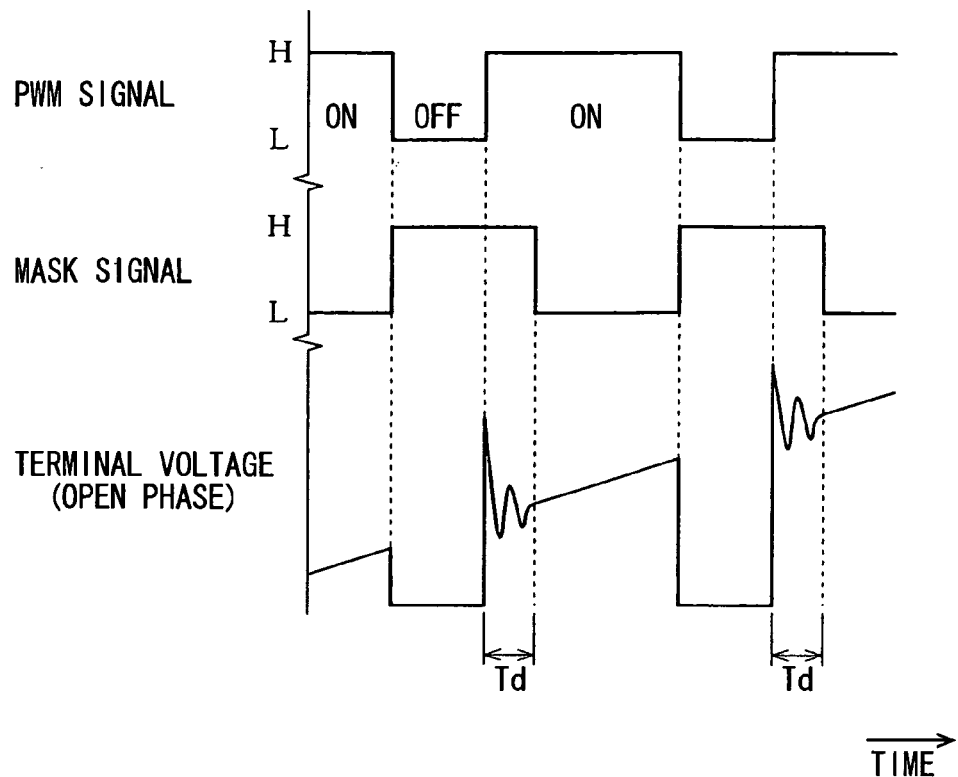
FIG. 18 is a waveform diagram showing a PWM signal, a mask signal, and a terminal voltage of an open phase according to the fifth embodiment.
FIG. 19 is a table showing the generation order of the regular logic of comparison signals Cu, Cv, and Cw.

When the PWM signal changes from the off-state (L level) to the on-state (H level), ringing occurs in the terminal voltage. FIG. 18 shows the waveforms of the PWM signal, the mask signal, and the terminal voltage of the open phase. In order to make an influence of ringing more distinguishable, a duration time of ringing and a mask period are shown in an exaggerated manner. When the terminal voltage of the open phase on which the ringing is superimposed is compared with the virtual neutral point voltage as it is, the comparison signal is inverted although the terminal voltage of the open phase does not reach the virtual neutral point voltage, and the detection timing of the position signals Pu, Pv, and Pw is off. Also, in a period where the PWM signal is off, since the current flows back, and the terminal voltage of the open phase is fixed to the vicinity of the ground level, a change in the induced voltage cannot be detected.

Under the above circumstances, the mask signal is validated as H level in the off-period of the PWM signal and the occurrence period of ringing, and the mask signal is invalidated as L level in other periods. More specifically, the mask signal is set to H level simultaneously when the PWM signal changes from on-state to off-state, and the mask signal is set to L level after a delay time Td required to sufficiently reduce ringing after the PWM signal changes from off-state to on-state has been elapsed. The required delay time Td is set based on the ringing duration time from the occurrence of ringing which has been actually measured in advance to the extinction of ringing, and the delay operation can be conducted by using, for example, a timer (not shown).

The control unit 20 outputs an off drive voltage (VB) to the transistor 18 in a period where the mask signal is L level, and outputs an on drive voltage (voltage of VB−Vf or lower) to the transistor 18 in a period where the mask signal is H level. As a result, the reference voltage generating part 19 generates the reference voltage Vr that alternately repeats the virtual neutral point voltage and VB in synchronism with the mask signal, as shown in FIG. 17. With the execution of the masking process, the reference voltage Vr in the off-period of the PWM signal and the occurrence period of ringing becomes the voltage VB which is higher than the maximum voltage VB−Vf that can be taken by the terminal voltages Vu, Vv, and Vw. As a result, during that period, the position signals Pu, Pv, and Pw are not detected.

With the execution of the masking process, the comparison signals Cu, Cv, and Cw change between H level and L level in synchronism with the mask signal in a period of the half cycle where H level should be originally held constant as shown in FIG. 17. In order to cope with this phenomenon, the control unit 20 regards the consistent level as the regular logic, and generates the position signals Pu, Pv, and Pw under the condition where the logic of the comparison signals Cu, Cv, and Cw coincides with the regular logic that is next scheduled with the rotation of the motor 2.

The generation order of the regular logic of the comparison signals Cu, Cv, and Cw at the time of normal rotation is shown in FIG. 19. The generation order is reversed at the time of reverse rotation. For example, at time t1 shown in FIG. 17, the comparison signals Cu, Cv, Cw change from L, L, H to H, L, H, respectively. Since this is a regular change from 1 to 2 in FIG. 19, the control unit 20 changes the position signal Pu from L level to H level. At time t2 subsequent to t1, since the mask signal is validated, the comparison signals Cu, Cv, Cw change from H, L, H to L, L, L, respectively. Because the levels are not the regular logic, the control unit 20 continuously maintains the position signal Pu to H level. As a result, the position signals Pu, Pv, and Pw from which an influence of the mask signal is removed are provided.

As described above, the terminal voltages Vu, Vv, and Vw are compared with the reference voltage Vr having a high voltage level which exceeds a voltage range that can be provided by the terminal voltages Vu, Vv, and Vw in at least the off-period of the PWM signal and a period until ringing disappears with turning on the PWM. As a result, it is possible to prevent the timings of the comparison signals Cu, Cv, and Cw from being off due to the occurrence of ringing.

The control unit 20 does not apply the logic change when the logic of the comparison signals Cu, Cv, and Cw do not coincide with the regular logic that is subsequently scheduled with the rotation of the motor 2. As a result, the control unit 20 removes the unnecessary level change that occurs in the comparison signals Cu, Cv, and Cw accompanied by the masking process, thereby enabling the correct position signals Pu, Pv, and Pw to be provided. The control unit 20 can drive the motor 2 based on the position signals Pu, Pv, and Pw, in the sensorless manner.

The reference voltage generating part 19 that generates the reference voltage Vr can be simply constituted by merely adding one transistor to the conventional configuration. For this reason, the reference voltage generating part 19 does not need to use a resource provided in the microcomputer, and is low in the costs, and easily applied to the conventional configuration.

(Sixth Embodiment)

Figure 20:
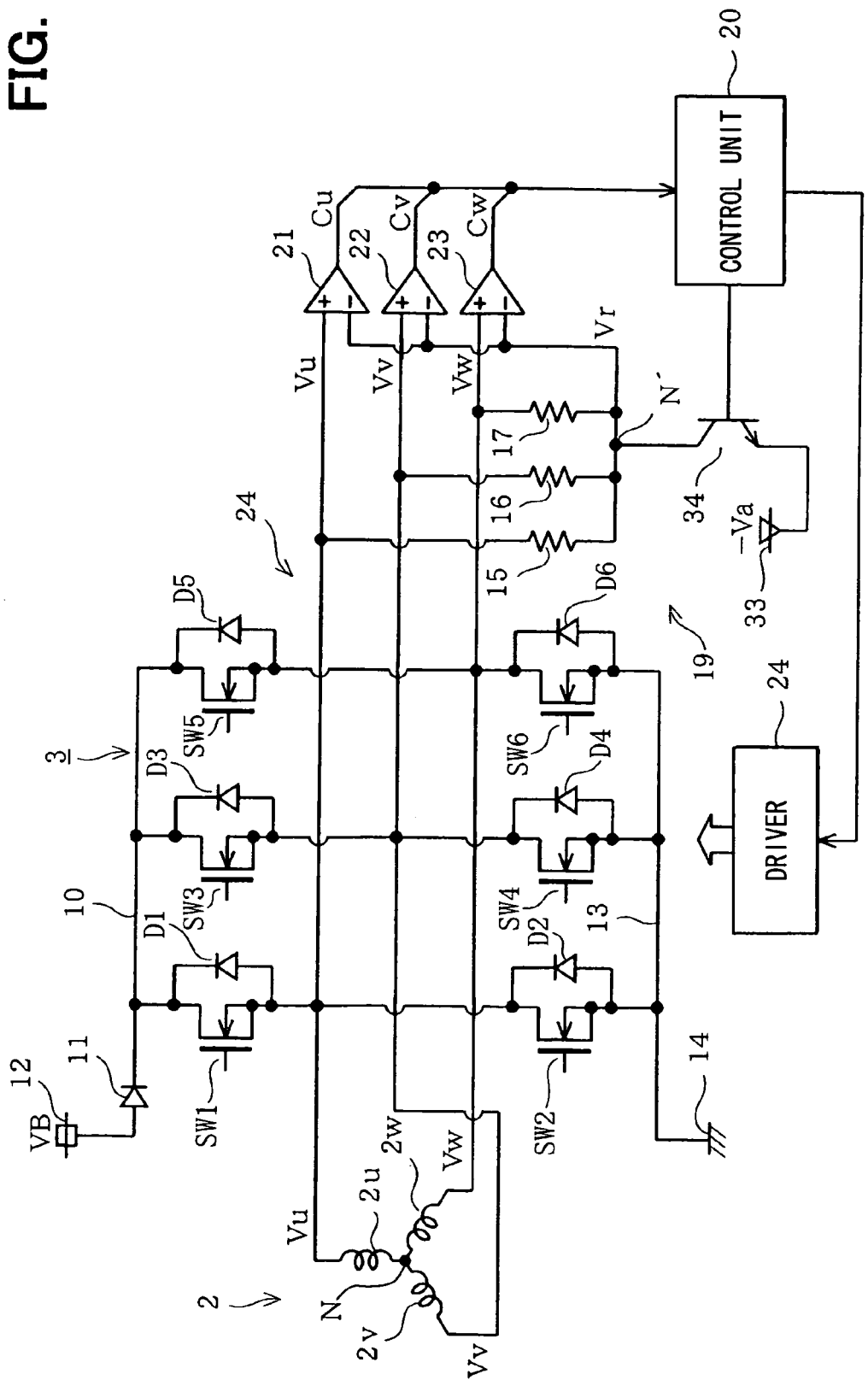
FIG. 20 is a circuit diagram showing a sixth embodiment of the present invention.

In the sixth embodiment, as shown in FIG. 20, the reference voltage generating part 32 has an npn type transistor 34 between the virtual neutral point N' and a negative power source 33. A voltage −Va that is lower than the ground level is applied to the transistor 34.

Figure 21:
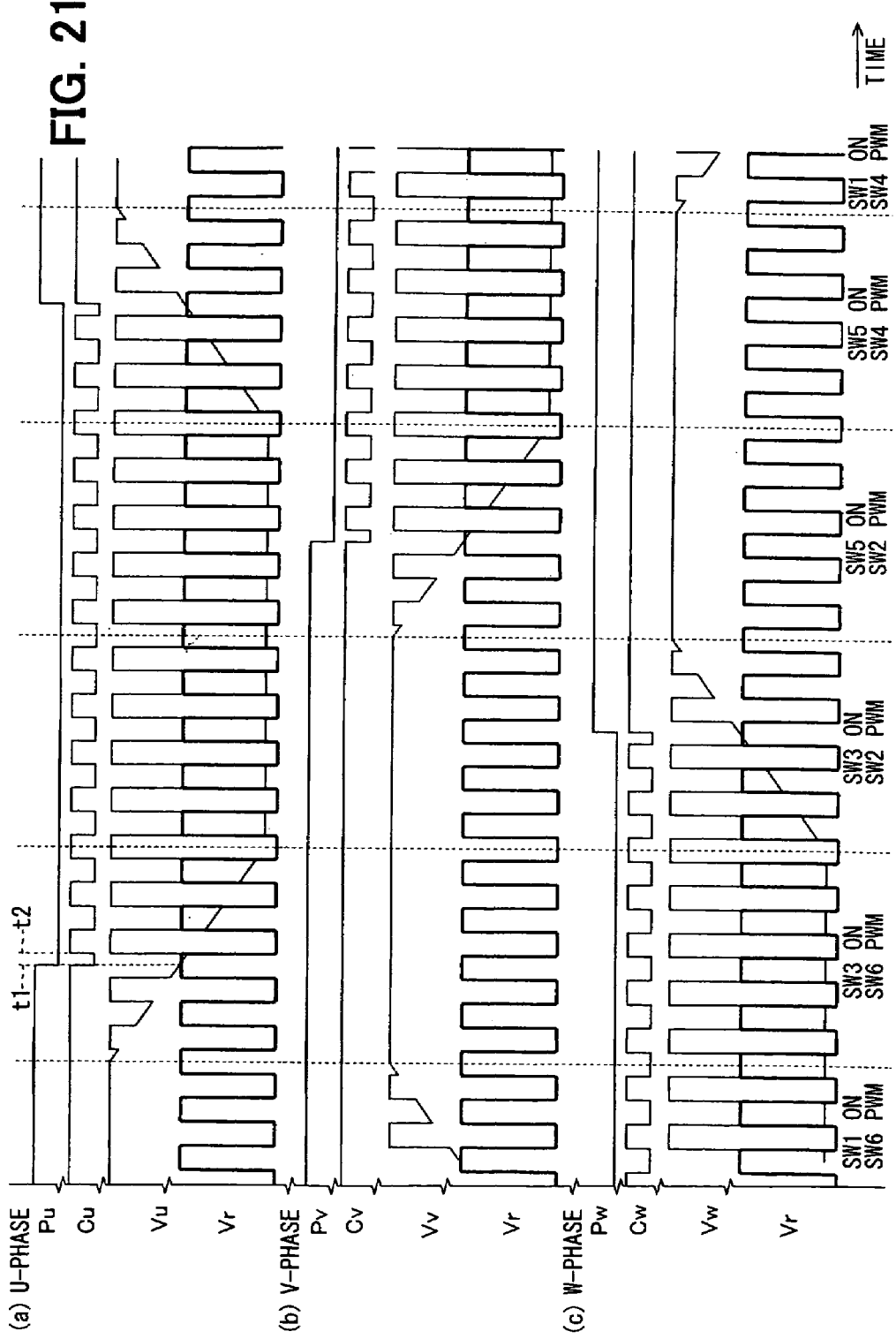
FIG. 21 is a waveform diagram showing signals applied to a U-phase, a V-phase, and a W-phase according to the sixth embodiment.
Figure 22:
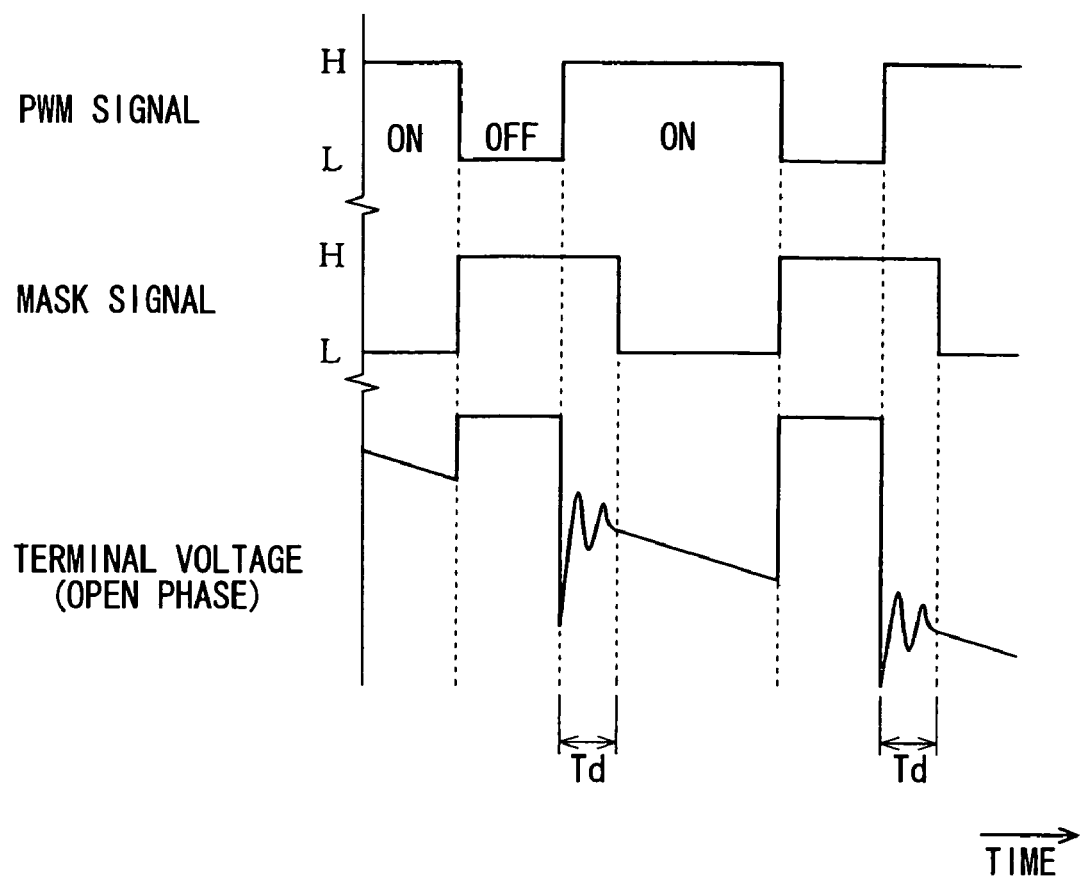
FIG. 22 is a waveform diagram showing a PWM signal, a mask signal, and a terminal voltage of an open phase according to the sixth embodiment.

FIG. 21 is a waveform diagram corresponding to FIG. 17. The control unit 20 PWM-drives the low side arms. When the PWM signal changes from the off-state (L level) to the on-state (H level), ringing occurs in the terminal voltage as shown in FIG. 22. Under the circumstances, the mask signal is validated as H level in the off-period of the PWM signal and the occurrence period of ringing, and the mask signal is invalidated as L level in other periods, as in the fifth embodiment.

The control unit 20 outputs an off drive voltage (−Va) to the transistor 34 in a period where the mask signal is L level, and outputs an on drive voltage (−Va+Vf or higher) to the transistor 34 in a period where the mask signal is H level. With the execution of the masking process, the reference voltage Vr in the off-period of the PWM signal and the occurrence period of ringing becomes a voltage −Va which is lower than the minimum voltage 0V that can be taken by the terminal voltages Vu, Vv, and Vw. As a result, during that period, the position signals Pu, Pv, and Pw are not detected. An influence of the mask signal which appears in the comparison signals Cu, Cv, and Cw is removed in the same manner as that in the fifth embodiment. In this way, even in this embodiment that PWM-drives the low side arm, the same operations and advantages as those in the fifth embodiment are provided.

(Seventh Embodiment)

Figure 23:
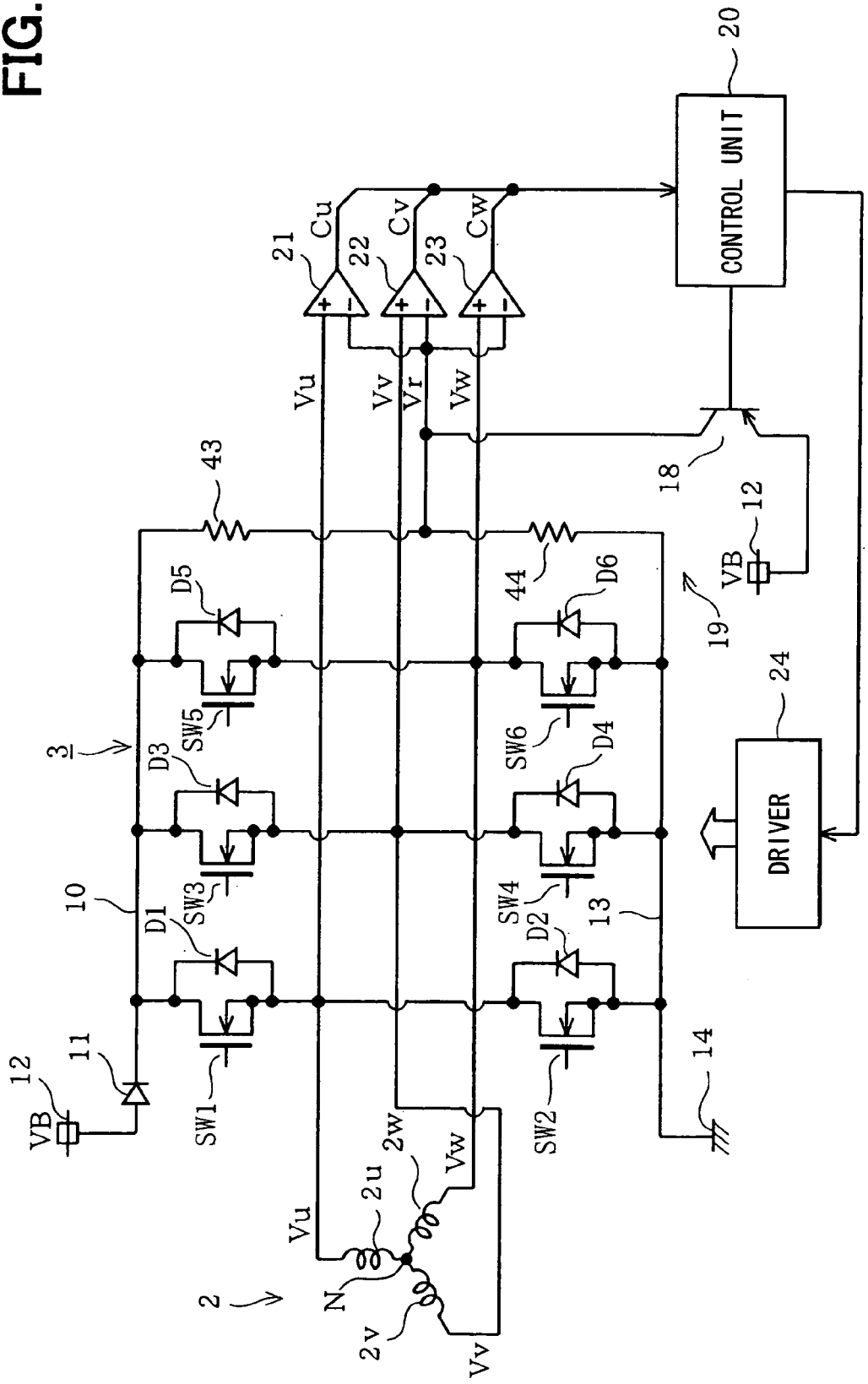
FIG. 23 is a circuit diagram showing a seventh embodiment of the present invention.

In the seventh embodiment, as shown in FIG. 23, the reference voltage generating part 19 employs a divided voltage of the DC voltage instead of the virtual neutral point voltage as the reference voltage Vr in the mask invalidity period. Resistors 43 and 44 having the same resistance are connected in series between the DC power wires 10 and 13. The common connection point of those resistors 43 and 44 is connected to the inverting input terminals of the comparators 21, 22, and 23, and the collector of the transistor 18. Other configurations are identical with those of the control system 1 described in the fifth embodiment, and the same operation and advantages are provided.

(Eighth Embodiment)

Figure 24:
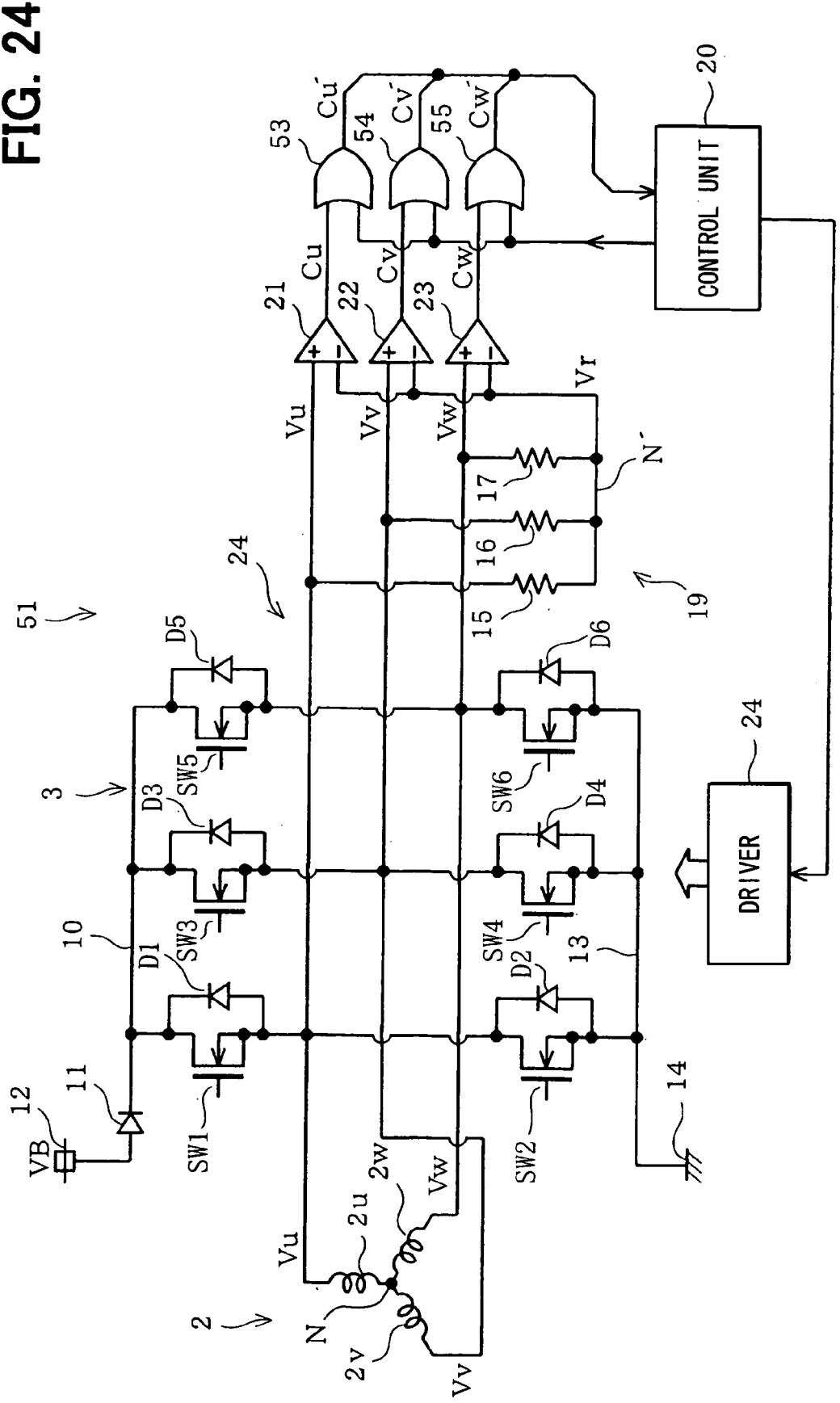
FIG. 24 is a circuit diagram showing an eighth embodiment of the present invention.

In the eighth embodiment, as shown in FIG. 24, the reference voltage generating part 52 is constructed to continuously output the virtual neutral point voltage to the comparators 21, 22, and 23 as the reference voltage Vr.

The comparison signals Cu, Cv, and Cw that are output from the comparators 21, 22, and 23 are input to OR gates 53, 54, and 55 that is masking part, respectively, to generate comparison signals Cu', Cv', and Cw' which are OR signals with the mask signals that are output from the control unit 20. The control unit 20 regards the consistent level as the regular logic, and generates the position signals Pu, Pv, and Pw under the condition where the logic of the comparison signals Cu', Cv', and Cw' coincides with the regular logic that is next scheduled with the rotation of the motor 2.

Figure 25:
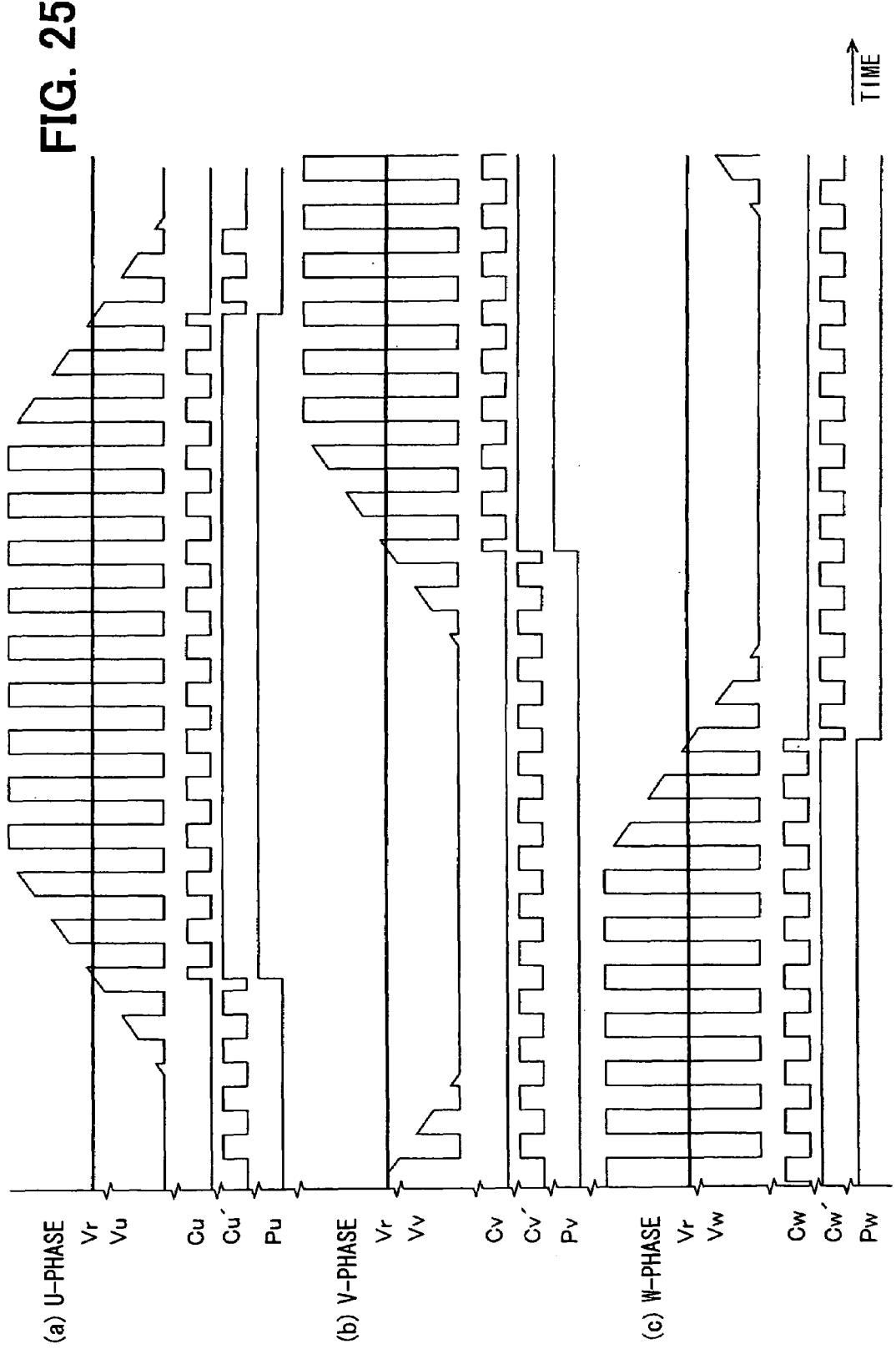
FIG. 25 is a waveform diagram showing signals applied to a U-phase, a V-phase, and a W-phase according to the eighth embodiment.

FIG. 25 is a waveform diagram showing (a) the U-phase, (b) the V-phase, and (c) the W-phase when the high side arm is PWM-driven through the 120° energization method. The reference voltage V is (VB−Vf)/2. When the PWM signal changes from the off-state to the on-state, ringing occurs in the terminal voltage. As a result, there is a case in which the change timing of the comparison signals Cu, Cv, and Cw is off due to ringing. Under the circumstances, in the mask validity period including the off period of the PWM signal and the occurrence period of ringing, the comparison signals Cu', Cv', and Cw' are generated by forcedly making the levels of the comparison signals Cu, Cv, and Cw in H level.

According to this embodiment, in the off-period of the PWM signal where the induced voltage cannot be detected, and the delay period required to sufficiently reduce ringing after the PWM signal changes from the off-state to the on-state, the comparison signals Cu, Cv, and Cw are masked. As a result, the comparison signals Cu', Cv', and Cw' having no phase displacement, and the position signals Pu, Pv, and Pw are provided. Since the masking part can be formed of only three OR gates 53, 54, and 55, this embodiment does not need to use the resource provided in the microcomputer, and is low in the costs and easily applied to the conventional configuration.

The masking part can be formed of three AND gates instead of three OR gates 53, 54, and 55. In this case, in the mask validity period including the off period of the PWM signal and the occurrence period of ringing, the comparison signals Cu', Cv', and Cw' are generated by forcedly making the levels of the comparison signals Cu, Cv, and Cw in L level. The control unit 20 regards the consistent level as the regular logic, and generates the position signals Pu, Pv, and Pw when the logic of the comparison signals Cu', Cv', and Cw' coincides with the regular logic as described above.

(Ninth Embodiment)

Figure 26:
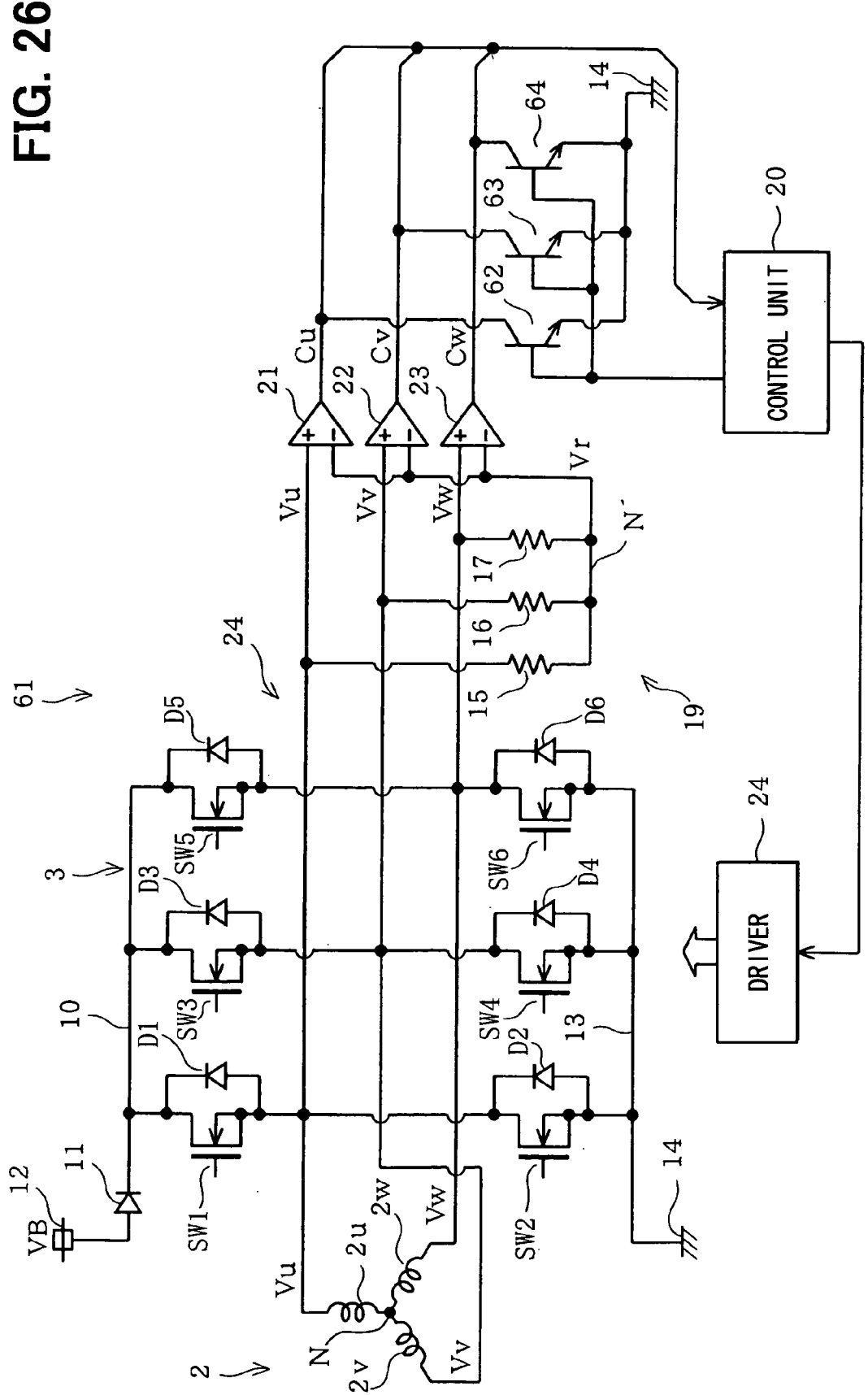
FIG. 26 is a circuit diagram showing a ninth embodiment of the present invention.

In the ninth embodiment, as shown in FIG. 26, npn type transistor 62, 63, and 64 are provided as the masking part between the output terminals of the comparators 21, 22, and 23 and the ground 14, and the mask signal is supplied to the bases of the transistors 62, 63, and 64 from the control unit 20.

In this embodiment, as in the case of using the AND gates in the eighth embodiment, in the mask validity period including the off period of the PWM signal and the occurrence period of ringing, the comparison signals Cu', Cv', and Cw' are generated by forcedly making the levels of the comparison signals Cu, Cv, and Cw in L level. Accordingly, the same operations and advantages as those in the eighth embodiment are provided.

(Tenth Embodiment)

In the tenth embodiment, the control system is configured to execute a current limit control instead of the PWM control. The current limit control is to control the on/off states of the switching elements SW1, SW3, and SW5 (FIG. 16) so that the currents that flow in the switching elements SW1, SW3, and SW5 of the high side arm become equal to or lower than a given limit value, respectively.

Figure 27:
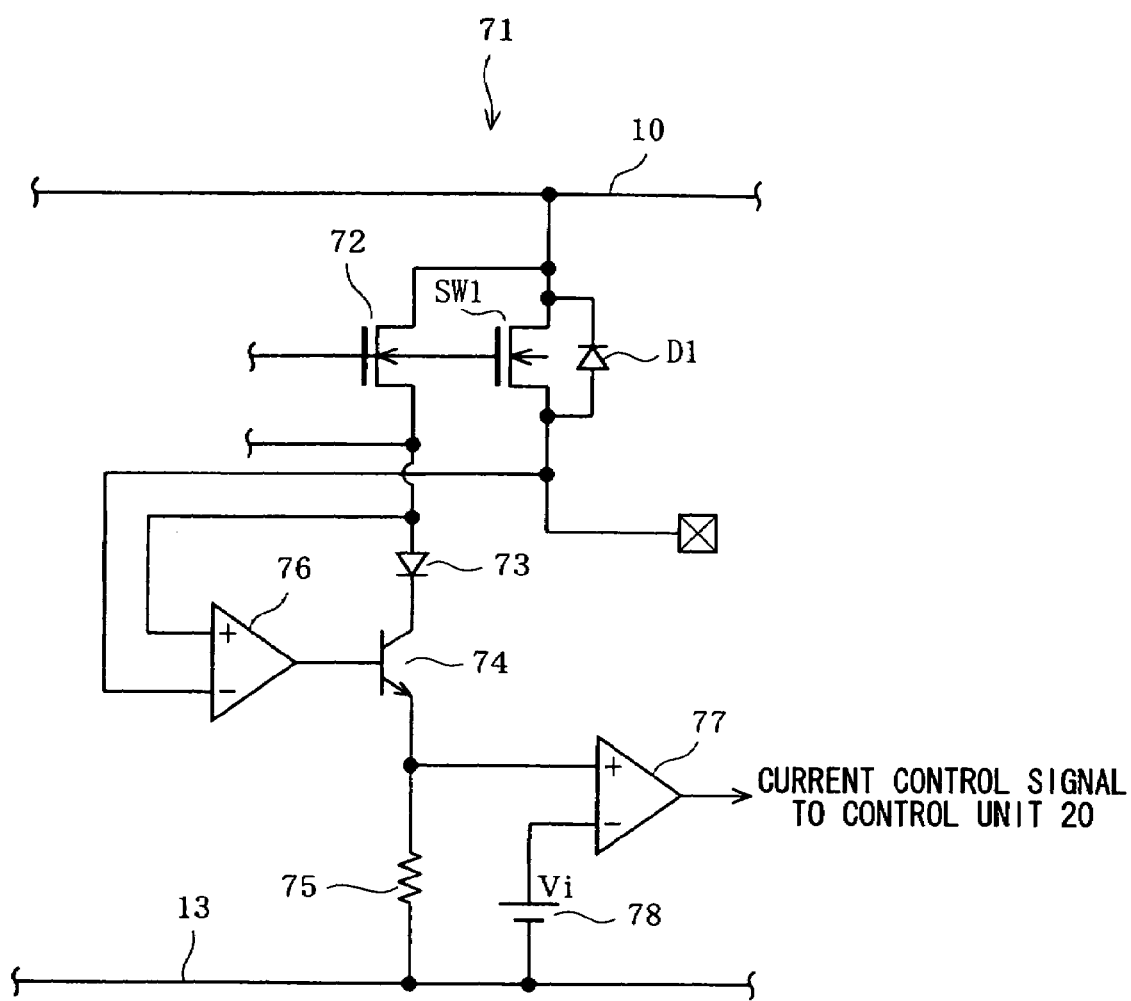
FIG. 27 is a circuit diagram showing a current control signal generator circuit according to a tenth embodiment of the present invention.

Therefore, as shown in FIG. 27, a current control signal generator circuit 71 is provided to turn on/off the switching element SW1. The same configuration is applied to the other switching elements SW3 and SW5. In the figure, the switching element SW2 of the low side arm is omitted. A sense n-channel switching element 72, a diode 73, an npn transistor 74, and a resistor 75 are connected in series between the DC power wires 10 and 13. The switching element SW1 and the switching element 72 have gates connected to each other and drains connected to each other. An operational amplifier 76 inputs the respective source potentials of those switching elements SW1 and 72, and drives the transistor 74. A comparator 77 inputs the voltage of the resistor 75 and a reference voltage Vi that is output from a reference voltage generator circuit 78 to output a current control signal.

The operational amplifier 76 controls the source potentials of the switching elements SW1 and 72 to be equal to each other so that the mirror ratio Nm of the switching elements SW1 and 72 is held constant. A diode 73 is connected in order to prevent the reverse flow of current. A detection current of 1/Nm of a current that flows in the switching element SW1 flows in the resistor 75. The comparator 77 outputs the current control signal of H level when the detection current is equal to or higher than the limit current based on the reference voltage Vi, and outputs the current control signal of L level when the detection current is lower than the limit current based on the reference voltage Vi. The control unit 20 turns off the switching element SW1 when the current control signal is H level, and turns on the switching element SW1 when the current control signal is L level.

Similarly, in this embodiment that conducts the current limit control, ringing occurs in the terminal voltage when the current control signal changes from the off-state (H level) to the on-state (L level). On the contrary, the configurations of the fifth to ninth embodiments can be applied, and the timings of generation of the position signals Pu, Pv, and Pw can be prevented from being displaced in phase.

(Modifications to Fifth to Tenth Embodiments)

In the seventh to tenth embodiments, the low side arm can be PWM-driven or current-limit driven as in the sixth embodiment.

In the fifth to tenth embodiments, when the voltage of the neutral point N of the motor 2 can be detected, the virtual neutral point voltage or the divided voltage of the DC voltage can be replaced with the actual neutral point voltage to generate the reference voltage Vr.

The control unit 20 can validate the mask signal before the PWM signal or the current control signal changes from the on-state to the off-state.

The pnp transistor 18 can be replaced with an npn transistor. The npn transistor 34 can be replaced with a pnp transistor. Also, a switching element or a switch circuit such as FET can be applied.

When the high side arm and the low side arm change over from the on-state to the off-state, a flyback voltage appears in the terminal voltage of the object phase. In order to prevent the false detection due to the flyback voltage, it is preferable that the masking process is conducted by using another mask signal in a given period from a change time point of the position signals Pu, Pv, and Pw.

The brushless DC motor 2 is not limited to three phases.

What is claimed is:

1. A control system for a multiphase rotating machine comprising:
   a power conversion circuit including a plurality of switching elements, which is formed of high potential side switching elements connecting respective phases of the multiphase rotating machine to a high potential side input terminal of the power conversion circuit, and low potential side switching elements connecting the respective phases to a low potential input terminal of the power conversion circuit, the power conversion circuit rendering a first phase of the multiphase rotating machine conductive to the high potential side input terminal of the power conversion circuit, and rendering a second phase conductive to the low potential side input terminal of the power conversion circuit to apply a voltage of a rectangular waveform to the multiphase rotating machine; and
   a control unit for operating the switching elements so as to alternately change over between a first state in which the first phase is rendered conductive to the high potential side input terminal through a high potential side switching element of the first phase and the second phase is rendered conductive to the low potential side input terminal through a low potential side switching element of the second phase, respectively, and a second state in which the first phase is rendered conductive to the low potential side input terminal through a low potential side switching element of the first phase and the second phase is rendered conductive to the high potential side input terminal through a high potential side switching element of the second phase, respectively, so as to modulate the voltage of the rectangular waveform in pulse width, wherein
   the control unit is configured to control all switching elements of the plurality of switching elements forming the first state and the second state by pulse width modulation as the first state and the second state are alternately changed over.

2. The control system for multiphase rotating machine according to claim 1, further comprising:
   a detector for detecting a rotation angle of the rotating machine by using an induced voltage, which appears in a terminal voltage of the rotating machine, the rotation angle being used to apply the voltage of the rectangular waveform based on detection of a zero-cross timing, at which the terminal voltage becomes a neutral-point voltage.

3. The control system for multiphase rotating machine according to claim 1, wherein:
   the control unit conducts a pulse width modulation process when at least one of a rotating speed, a torque, and a current of the multiphase rotating machine is limited, and applies the voltage of the rectangular waveform directly to the multiphase rotating machine when no limitation is requested.

4. The control system for multiphase rotating machine according to claim 1, wherein:
   the power conversion circuit further includes rectifying parts that are connected in parallel to the switching elements and define a direction to the high potential side switching element side as a forward direction; and
   the switching elements allows a current to flow bi-directionally.

5. The control system for multiphase rotating machine according to claim 1, wherein:
   the control unit is configured to perform the pulse width modulation during a predetermined period, in which the first phase is conductive to the high potential side input terminal and the second phase is conductive to the low potential side input terminal.

6. A control system for a multiphase rotating machine comprising:
   a power conversion circuit including a plurality of switching elements, which is formed of high potential side switching elements connecting respective phases of the multiphase rotating machine to a high potential side input terminal of the power circuit, and low potential side switching elements connecting the respective phases to a low potential input terminal of the power conversion circuit, the power conversion circuit putting a specific phase of the multiphase rotating machine into a high impedance state in which neither of a high potential side input terminal nor a low potential side input terminal is rendered conductive, and sorting the remaining phases into two phases that are rendered conductive to the high potential side input terminal and rendered conductive to the low potential side input terminal; and
   a control unit for operating the power conversion circuit so as to divide the two phases into a first phase and a second phase, and alternately rendering the first phase and the second phase conductive to the high potential side input terminal through a high potential side switching element thereof and the low potential side input terminal through a low potential side switch element thereof, respectively, wherein
   the control unit is configured to control all switching elements forming the first phase and the second phase by pulse width modulation as the first phase and second phase are alternately rendered conductive to the high potential side input terminal and the low potential side input terminal.

7. The control system for multiphase rotating machine according to claim 6, wherein:
   the power conversion circuit includes rectifying parts that are connected in parallel to the switching elements and define a direction to the high potential side switching element side as a forward direction; and
   the switching elements allows a current to flow bi-directionally.

8. The control system for multiphase rotating machine according to claim 6, wherein:
   the control unit is configured to perform the pulse width modulation during a predetermined period, in which the first phase is conductive to the high potential side input terminal and the second phase is conductive to the low potential side input terminal.

9. A control system for a multiphase rotating machine, comprising:
   a power conversion circuit including a plurality of switching elements, the power conversion circuit rendering a first phase of the multiphase rotating machine conductive to a high potential side input terminal of the power conversion circuit, and rendering a second phase conductive to a low potential side input terminal of the conversion circuit to apply a voltage of a rectangular waveform to the multiphase rotating machine; and a control unit for operating the switching elements so as alternately change over between a first state in which the first phase is rendered conductive to the high potential side input terminal and the second phase is rendered conductive to the low potential side input terminal, respectively, and a second state in which the first is rendered conductive to the low potential side input terminal and the second phase is rendered conductive to the high potential side input terminal, respectively, so as to modulate the voltage of the rectangular waveform in pulse width, wherein each of the first phase and the second phase includes a high potential-side switching element and a low potential-side switching element connected in series between the high potential side input terminal and the low potential side input terminal, the control unit is configured to control the high potential-side switching element and the low potential-side switching element of each phase to alternatively change between the first state and the second state and to obtain opposite states between an on-state and an off-state, and the control unit is configured to control the high potential-side switching element and the low potential-side switching element of each phase by width modulation in each of the first state, the second state, the on-state, and the off-state.

* * * * *